(12) United States Patent
Kielkopf et al.

(10) Patent No.: US 8,693,735 B2
(45) Date of Patent: Apr. 8, 2014

(54) SYSTEM AND METHOD FOR PRECISION MEASUREMENT OF POSITION, MOTION AND RESONANCES

(75) Inventors: John F. Kielkopf, Louisville, KY (US); Jeffrey Hay, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 160 days.

(21) Appl. No.: 13/410,156

(22) Filed: Mar. 1, 2012

(65) Prior Publication Data

US 2012/0243747 A1     Sep. 27, 2012

Related U.S. Application Data

(60) Provisional application No. 61/447,846, filed on Mar. 1, 2011.

(51) Int. Cl.
G06K 9/00 (2006.01)
G01B 9/02 (2006.01)

(52) U.S. Cl.
USPC ............. 382/107; 382/274; 356/477

(58) Field of Classification Search
CPC ........................................................ G06K 9/00
USPC ......... 382/100, 103, 106–107, 154, 162, 168, 382/173, 181, 199, 209, 224, 232, 254, 274, 382/276, 286–291, 305, 312; 356/520, 497, 356/477; 702/159; 372/20
See application file for complete search history.

(56) References Cited

U.S. PATENT DOCUMENTS

| | | | | |
|---|---|---|---|---|
| 5,910,839 A * | 6/1999 | Erskine | ........................ | 356/497 |
| 6,160,826 A * | 12/2000 | Swanson et al. | ................ | 372/20 |
| 6,611,787 B2 * | 8/2003 | Stringer et al. | ............... | 702/159 |
| 7,567,713 B2 * | 7/2009 | Ding | ............................ | 382/199 |
| 8,553,233 B2 * | 10/2013 | Newman | ....................... | 356/520 |

* cited by examiner

Primary Examiner — Seyed Azarian
(74) Attorney, Agent, or Firm — Wyatt, Tarrant & Combs, LLP; Stephen C. Hall

(57) ABSTRACT

A non-contact sensing system for measuring and analyzing an object's position, motion, and/or resonance utilizes optical capturing of image features, data extraction, and signal processing to determine changes in the object's motion or position according to changes in signals, which are associated with the excitation of photons due to the object's motion.

20 Claims, 31 Drawing Sheets

SYSTEM AND METHOD FOR PRECISION MEASUREMENT OF POSITION, MOTION AND RESONANCES

CROSS REFERENCE TO RELATED U.S. APPLICATIONS

This application claims priority to U.S. Provisional 61/447,846 filed on Mar. 1, 2011, and incorporates by reference the entirety of the provisional application.

GOVERNMENT RIGHTS

The invention was made with U.S. Government support from the Department of Homeland Security (DHS No. HSHQDC-07-3-00005) through the National Institute for Hometown Security (NIHS No. 13-07-UL). The U.S. Government has certain rights in the invention.

BACKGROUND

As disclosed in U.S. Pat. No. 7,567,713 to Ding, issue date of Jul. 28, 2009, it is known that static edge positions in video images can be determined with high precision. Such technology measures a change in illumination to determine where an edge is. Additionally, existing non-contact systems and methods utilize laser Doppler vibrometers and/or extensometers. These devices are known to place markers on an object and to then look for pixel movement on a sharp edge. As such, techniques, sensors, and related apparatus for determining an object's static edge position are known.

However, there is a present need for a system and methods for determining an object's position, motion and resonances that expand upon the current technology for determining static edge position of an object, for example by analyzing a surface of an object as opposed to an edge. A challenge with non-edge surface analysis of an object, however, is that surfaces usually lack a similar degree of visual contrast that is typically associated with edges.

SUMMARY OF INVENTION

Present embodiments and alternatives described and claimed herein are used for sensing position, changes in position, movement, and resonances of a moving object or objects, in some cases with sub-pixel precision, without need of physical contact with a surface of the object. Some embodiments utilize one or more optical sensors, such as single-element photodiode sensors. Alternative embodiments utilize a multiple element system including a video camera with digitizer. Some embodiments utilize high dynamic range, low-noise photo sensors, and diffraction-limited imaging, in order to obtain desired sensitivity to positioning of features in the object. As discussed herein, dynamic range is in the context of the sense of sight, and the perception of light.

Various practical applications exist, including, but not limited to, analyzing structural integrity of bridges, bridge support cables, buildings, and similar structures; detecting resonances in machinery; detecting motions of a surface; analyzing liquid and gas flow in a conduit and the structural integrity and performance of a conduit; and biomedical monitoring, e.g., assessing circulation and respiration of an individual. Accordingly, certain embodiments are provided for detecting surface motions as small as 10 nanometers (nm), in which detection is based on the properties of light falling on the sensor element. Embodiments are provided in which measurements are taken of objects surrounded by visible light, or when no illumination of light within the visible spectrum is available, e.g., using infrared light. In some embodiments, the analyses convey information regarding activities occurring proximal to the object, where such activities produce sound and motion.

In use, light illuminating an object element of interest is measured and analyzed with high spatial resolution, high signal-to-noise ratio, and high dynamic range to extract changes due to motion of the object element. The amplitude of the detected light is modified by changes in the properties of the object element due to its position, inclination, transmissivity, reflectivity, and texture. Periodic processes at the object element have singular, unique frequencies, and complex events have characteristic principal components that are identified in the data space. The digitized signals are evaluated for principal components in near-real time, and the imaged field is analyzed in a four-dimensional space of the two dimensions of the field of view plus frequency and time. The sensor systems and methods described and claimed herein provide for a non-contact measurement of motion in response to impulse, and the identification of the location of those motions. By comparison with object models of existing systems, the embodiments and alternatives provided herein yield an assessment of the current condition, positioning, and movement of the object element, and are not limited to edge detection.

Compared to existing methods in the art, such as static edge detection, which utilize a distributed network of wired or wireless sensors supplemented by visual inspection for deterioration or change, and frequently require physical contact with the object. By comparison, the embodiments and alternatives provided herein analyze a scene, which includes the object element, from a distance, without need of physical contact with the object element, and are sensitive enough to identify failures that would not otherwise be visible.

Mathematically, a signal is generated proportional to the total number of photons that arrive at the sensor during a pre-determined exposure time period. For a high-contrast feature of a scene imaged onto a single-element or multiple element sensor, the fractional modulation of the signal, m, in the limit of small object motion, dx, is expressed as:

$$m = (f/r)(dx/w)$$

where w is the width of the sensor element (or, for a video sensor, the width of the pixel), r is the distance to the object element, and f is the focal length of the imaging system. If the object element's image moves, then the modulation is expressed as:

$$m = dx'/w$$

where dx' is the relative image motion on the sensor. The object element's motion, dx, with a modulation equivalent to the modulation with sensor displacement, dx', may be expressed as $$dx = (r/f)dx'$$

Also, the detected optical signal modulation can be calibrated, in order to determine the change in position of the object element responsible for the detected modulation of light, using the equation:

$$dS/(S_1 - S_0) = (f/r)(dx/p)$$

where $S_1$ is a first reference signal measured from a first pixel immediately adjacent the object element, $S_0$ is a second reference signal measured from a second pixel immediately adjacent the object element, the second pixel being positioned opposite the first pixel relative to the object element, f is the focal length of the light acceptor, r is the distance between the light acceptor and the object element, dx is the physical displacement of the object element, dx is proportional to dS, and p is the physical size of the pixel included in the image of the object element.

The linear relationship between modulation and object element displacement provides a straightforward way to calibrate the modulation as a measure of actual displacement at the object element, for example using an in situ accelerometer or laser Doppler vibrometer. Assuming that signal noise will primarily comprise shot noise in the photocurrent, then the smallest detectable sensor motion δx' equivalent to the noise is expressed as:

$$\delta x' = (N_e^{1/2}/N_e)w$$

where $N_e$ is the number of photoelectrons (electrons emitted from an atom by interaction with a photon) in the signal.

Thus, the minimum object element motion for producing a modulation equivalent to signal noise is expressed as:

$$\delta x = (r/f)w N_e^{-1/2}$$

Thus, it will be appreciated that high signal-to-noise detection extends spatial sensitivity of the system to sub-pixel motion.

BRIEF DESCRIPTION OF THE DRAWINGS

The foregoing summary, as well as the detailed description of various embodiments and alternatives set forth herein, will be better understood when read in conjunction with the appended drawings. The drawings and embodiments described within this specification are to be understood as illustrative of structures, features and aspects of the present embodiments and not as limiting the scope of the embodiments. It should be understood that the application is not limited to the precise arrangements and instrumentalities shown. In the drawings.

MULTIPLE EMBODIMENTS AND ALTERNATIVES

Figure 1A:
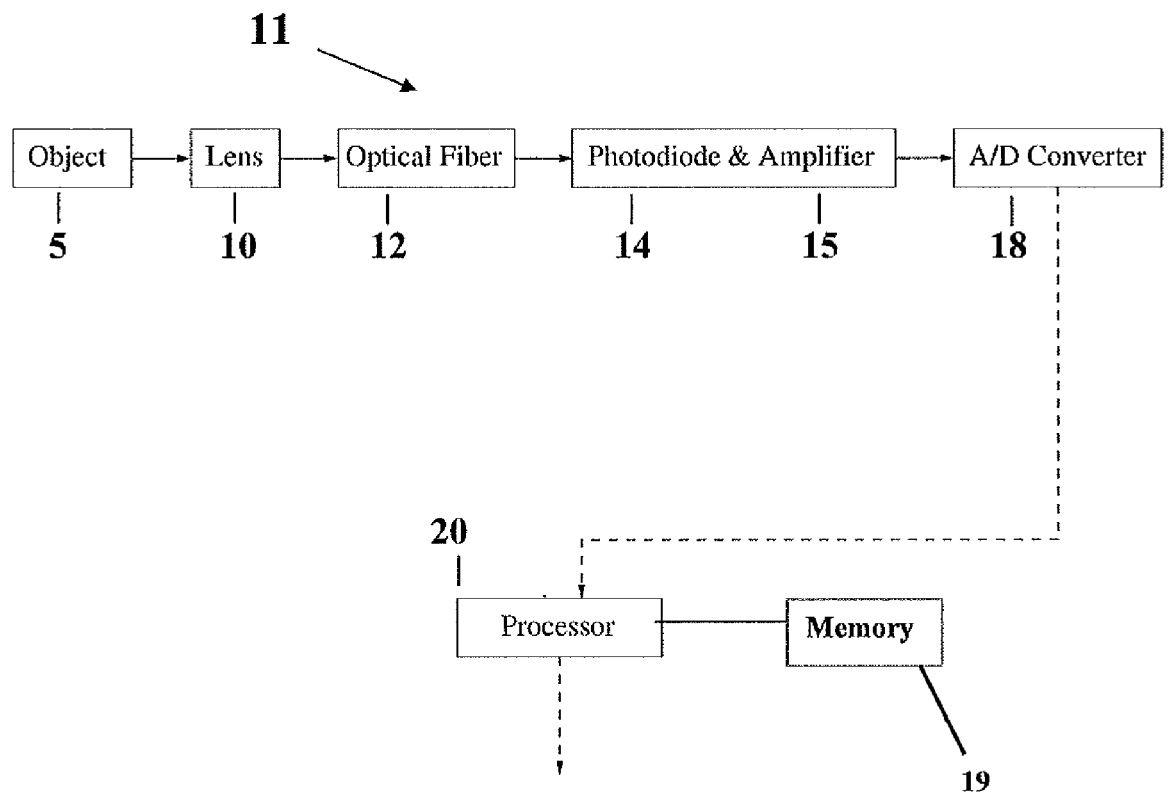
FIG. 1A is a block diagram of a single-element sensor system, according to multiple embodiments and alternatives.

Various embodiments and alternatives of systems and methods as described herein are to be understood as illustrative, rather than as limiting. In the following descriptions, certain terminology is used for convenience only, and is not limiting.

With both the single-element sensor system and the multiple element sensor system as described herein, an object element of interest is imaged by an optical system. In some embodiments, a light acceptor focuses upon a scene, comprising a field of vision that includes an object element of interest, in order to directionally select the light that enters the system, while excluding light from outside the field of vision. Data related to the image are then extracted, including data associated with photons emanating from various regions of the object element. In some embodiments, the sensor system detects visible light. Alternatively, the sensor system detects light that is not visible to the human eye, for example light within the infrared (IR) spectrum from an IR light source. Various embodiments disclosed herein maximize the accepted light and reject the unwanted background.

The extracted data includes the amplitude of light modulating from a surface of the object element or other elements over selected time intervals. These data are then processed to transform from a time domain sequence to a frequency domain spectrum across the time interval. It will be appreciated that a given object element in the scene can be represented by two spatial dimensions (e.g., length and width), as well as a third dimension to form a data cube. In some embodiments, the unprocessed data are represented by axes, x-y-t, where the x and y axes are spatial dimensions, and t is time. The data are then processed and transformed into one or more data cubes represented by axes x-y-f, where f is frequency, providing a visualization of the data in a 3-dimensional scene which appears normal when viewed along the frequency axis. In some embodiments, by selecting principal components representing the frequency spectrum, Eigenimages are produced depicting the changing dynamics of a scene over time.

Differences in the reflectivities from one region to another on an object element's surface create transitions from brighter to darker regions (and vice versa). As the object element moves, those regions move across the optical field, and the transitions from bright to dark (and vice versa) fall on the sensor element and are detected as contrast. Because the data reflect positioning along a surface of an object element, the signal produced is indicative of changes in positioning, i.e., motion.

Moreover, configuring the system to process only the changes in signal data allows for very slight motions to yield distinct signatures of events occurring within a scene. This also allows static features of the scene to be rejected and not used in determining the signal. Given the unique signatures associated with motions of interest, calibrated models can yield quantitative information regarding one or more object element(s) in a scene.

Figure 1B:
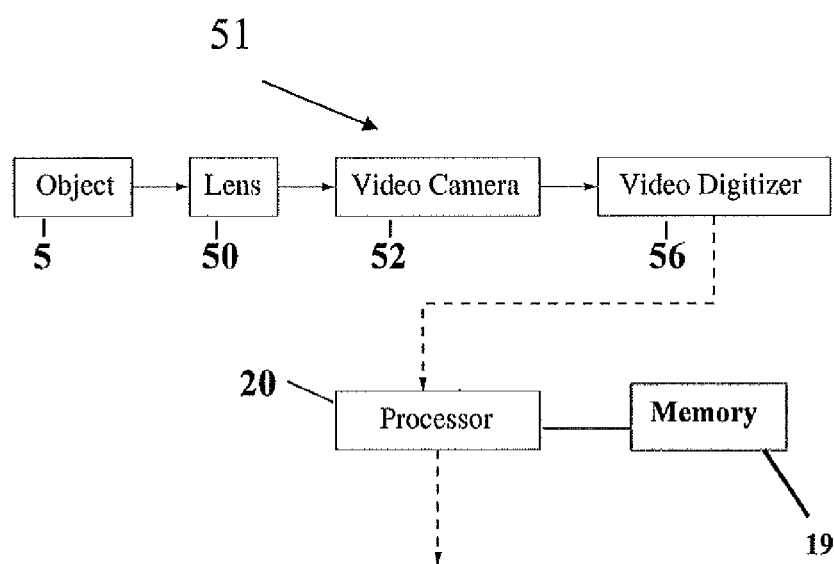
FIG. 1B is a block diagram of a multiple-element video sensor system, according to multiple embodiments and alternatives.

As FIG. 1A and FIG. 1B illustrate, in some embodiments, processor 20 is communicatively coupled to a computer readable storage medium, e.g. memory 19, which may optionally include read-only memory (ROM), random access memory (RAM), non-volatile RAM (NVRAM), optical media, magnetic media, semiconductor memory devices, flash memory devices, mass data storage device (e.g., a hard drive, CD-ROM and/or DVD units) and/or other storage as is known in the art. Processor 20 further includes or is communicatively coupled to memory 19 having computer executable program instructions which, when executed by processor 20, cause processor 20 to perform various functions. These include receiving signals as to the amplitude of light modulation from objects in the field of vision, determining the frequency of the light modulation based on the amplitude, and performing other steps as described herein. Processor 20 may include one or more general or special purpose microprocessors, or any one or more processors of any kind of digital computer. Alternatives include those wherein all or a portion of processor 20 is implemented by an application-specific integrated circuit (ASIC) or another dedicated hardware component as is known in the art.

A. Single-Element Sensor Systems

FIG. 1A shows a block diagram illustration of a single-element sensor system 11, according to multiple embodiments and alternatives. In some embodiments, a lens 10 having a focal plane (not shown) is provided for focusing a scene, including an object element 5 of interest, onto an optical fiber 12. Preferably, the diameter of optical fiber 12 is suitably matched to object element 5 so that it is sampled by the optical fiber 12 in the focal plane of the lens, and lens 10 is a diffraction-limited lens. In some embodiments, however, lens 10, is optional, in that an optical fiber (with or without a lens), and/or at least one mirror are also light acceptors. Alternatively, a bare fiber with no lens (not shown), or an open cylinder (not shown) having baffles positioned at the input end to allow certain light to enter the system while blocking light from outside the field of view, are also light acceptors, in that each provides for a finite field of view.

In some embodiments, a transducer is optically coupled to the output of optical sensor 12, such as an optical fiber, in order to acquire a signal of light modulating from an object element 5 of a scene. In some embodiments, transducer 14 converts light received from object element 5 into an electrical signal, such as a current or voltage, indicative of the modulation occurring at the object element. Optionally, transducer 14 is integrated with a low-noise, high-gain amplifier 15, such that the electronics respond to frequencies from 0 to 1000 Hz, and the output is shot-noise limited. This signal is matched to a converter 18, which is peripheral to a processor 20 for processing signals generated by the single-element sensor system.

As may be selectably chosen by a user, transducer 14 is a low-noise, small-area, photodiode, or, alternatively, a photomultiplier or a photoconductor, such as cadmium sulfide. An indium gallium arsenide photodiode is suitable for use with some embodiments. In some embodiments, converter 18 is a 24-bit analog-to-digital (A/D) converter. In some embodiments, the dynamic range of the system is on the order of about 1,000,000:1.

In some embodiments, collected light is converted into an electrical signal by a high dynamic range image sensor, operating fast enough to capture frequencies of interest, as determined by principal component analysis. Preferably, sensor input contains sufficiently low noise that the modulated components of the signal are distinguished from an unmodulated or randomly varying background, while minimizing unwanted effects from factors in the scene around the object element, such as intervening turbidity (i.e., noise) or absorbing media (i.e., having a muffling effect on the light transmitted).

Photons from the scene are delivered to the sensor where each photon generates a single photoelectron. At low light level, the noise in the electrical signal may be due to the statistics of the flux of detected photons, that is, nominally Gaussian random noise with a signal-to-noise ratio of $N^{1/2}$, where N is the number of photons detected. Under normal daylight conditions, a dynamic range of 1,000,000:1 is achieved with discrete photodiodes. The signals of interest, often only a few parts per million of the total signal, are extracted from the measurements at each point of interest in the field of view using known algorithms to include principal component analysis (PCA), Reed and Xiaoli (RX) anomaly algorithm, and Fast Fourier Transform (FFT) methods. Processor 20 thus analyzes the x-y-t cube along the time axis by selecting intervals sufficiently long and well-sampled to reveal frequencies of interest within the particular interval.

Figure 1C:
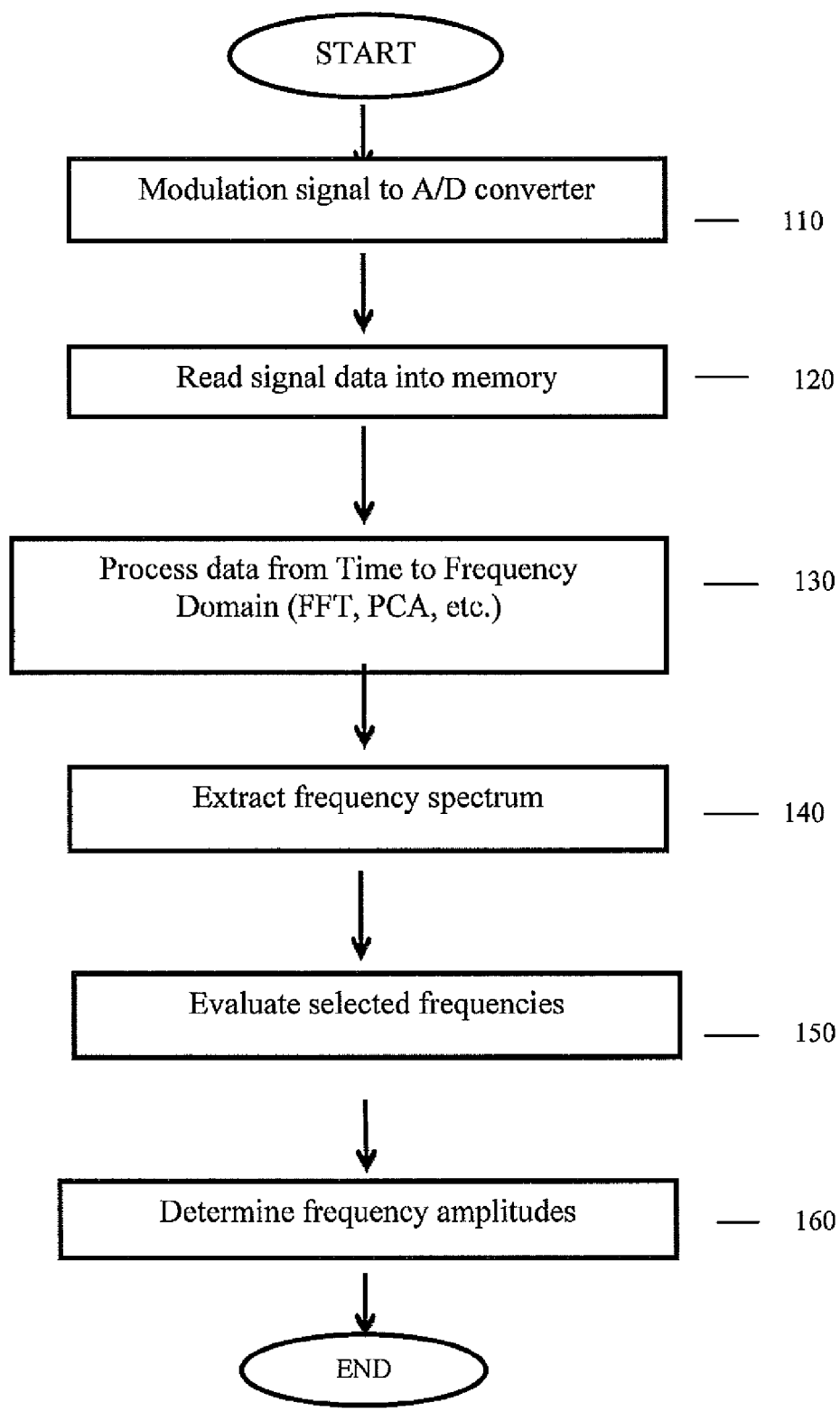
FIG. 1C is a flow chart showing one embodiment of a single-element sensory system, according to multiple embodiments and alternatives.

FIG. 1C is a flow chart depicting an example embodiment of the single-element sensor system 11. Light from a scene is accepted into system 11 and converted to an electrical signal by transducer 14, which can be a photodiode. Optionally, the signal is amplified, then it is matched to converter 18 at step 110. The spatial dimensions plus time interval associated with the signal are then read into memory 19 of processor 20 at step 120. Computer executable instructions (not shown) are utilized in processing one dimension of the data from time to the frequency domain at step 130. Frequencies of interest are determined, and the frequency spectrum for such frequency values, are then extracted at step 140, for example using principal component analysis. At step 150, the selected frequencies are then evaluated, and then are plotted against amplitudes which can be determined through conventional techniques and instruments, e.g., vibrometry. In some embodiments, in addition to transforming the data in one of the dimensions from a time domain sequence to a frequency domain spectrum across the time interval, processor 20 also produces Eigenimages in the frequencies of interest, which depict the changing dynamics of a scene over time.

Single-element sensor systems include, therefore, various embodiments and alternatives wherein the sensors respond to modulations of interest in the object element 5, and then spatially isolate defined features of the object element, with a dynamic range sufficient to detect signal modulation on a strong unmodulated background, and a signal-to-noise ratio sufficient to enable detection of relatively small signals from the depicted scene.

B. Multiple Element Sensor Systems

FIG. 1B shows a block diagram illustration of a multiple element sensor system 51, according to multiple embodiments and alternatives. Whereas photodiode 14 of the single-element system acquires only one element of a scene, the multiple element video system 51 measures multiple elements simultaneously to produce a detailed image.

In some embodiments, a lens 50 having a focal plane (not shown) is provided for focusing a scene, including the object element 5 of interest, onto a video camera 52 having an image forming element such as a camera lens (not shown). In some embodiments, a video digitizer 56 is optically coupled to the video camera 52, in order to acquire signals from the depicted scene, which are sent to processor 20 for processing signals generated by the multiple element sensor system 51. In some embodiments, video digitizer 56 converts light received from object element 5 into an electrical signal. In some embodiments, video digitizer 56 has an integral 14-bit digitizer, thereby rendering digital data to run a full frame rate at about 107 Hz, with subareas at up to about 1 Khz. In some embodiments, a low-noise, high-gain amplifier is integrated with video digitizer 56, and the output is shot-noise limited. The signal may be matched to a converter, which is peripheral to processor 20.

In some embodiments, the camera lens is selected to match a single pixel to an object element 5 of interest. Alternatively, an extended dynamic range mode of sensor system 51 matches a virtual pixel encompassing several individual pixels to the object element. The virtual pixel may be obtained by taking a sum of several individual pixels. In some embodiments, the virtual pixel is obtained by determining a criteria representing a threshold value of light modulation and summing several pixels that meet that criteria. Thus, objects in the field of vision, including the object element, are imaged according to the dimensions of length and width (i.e., two spatial dimensions), frequency, and time. Conventionally, the scale size of a video sensor pixel for a typical Charge-Coupled Device (CCD) or Configuration Memory Operating System (CMOS) is a few microns. By comparison, typically optical fiber 12 of single-element sensor system 11 corresponds to about 100 microns. Consequently, the optical front ends of sensor system 51 are not necessarily identical to those of sensor system 11.

As with discrete photodiodes, photons from the scene are delivered to the sensor system 51 where each photon generates a single photoelectron. At low light level, the noise in the electrical signal may be due to the statistics of the flux of detected photons, that is, nominally Gaussian random noise with a signal-to-noise ratio of $N^{1/2}$. Under normal daylight conditions, a dynamic range of 10,000:1 is achieved with video sensors. The dynamic range with video technology is extended by co-adding frames to increase the total photoelectron count. The signals of interest, often only a few parts per million of the total signal, are extracted from the measurements at each point of interest in the field of view using known algorithms to include principal component analysis (PCA), Reed and Xiaoli (RX) anomaly algorithm, and Fourier methods. Processor 20 thus analyzes the x-y-t cube along the time axis by selecting intervals sufficiently long and well-sampled to reveal frequencies of interest within the particular interval. In some embodiments, processor 20 transforms the data from a time domain sequence to a frequency domain spectrum across the time interval and produces Eigenimages in the frequencies of interest, which depict the changing dynamics of a scene over time.

In some embodiments, digital data obtained by sensor system 51 are transmitted to processor 20 through any of various network connections as are known in the art, such as, for example, a FireWire connection. In operation, single pixels from the frame have measured in a dynamic range of about 16,384:1, which can detect signals of interest up to 53 Hz in the frequency domain. Further still, the dynamic range of system 51 is extended by summing pixels. For example, for a sharply edged line the data may be summed along the line in edge detection. But for a larger virtual pixel, the data from several pixels is summed during processing. For lower frequency signals of interest, sequential frames acquired at high speed may be summed in external memory prior to analysis, providing sensor system 51 with 17 bits (131,072:1) of dynamic range for single-pixel production of Eigenimages at frequencies lower than 10 Hz.

In an example embodiment of a multiple element sensor system 51, an imaging sensor includes an array of 10 μm wide pixels, each of $10^4$ electrons well depth, summed over 400 rows for a measurement of an edge transition parallel to a column on the array. In this configuration, the imaging sensor will capture $4 \times 10^6$ photoelectrons. If a diffraction-limited lens of focal length 1 meter (f) is used to observe a scene, including an object element within the scene, that is 100 meters (r) away, then the smallest detectable object element motion is 0.5 μm (δx), which is approximately the same average wavelength of visible light. Smaller motions are detectable at closer distances.

By way of additional example, again not meant as limiting, a telescope with an aperture of 25 cm resolves features as small as 0.5 mm at a distance of 250 meters in visible light. Sensor embodiments described herein extract the position of those features to an accuracy expressed as a percentage of no more than about 0.1% of this feature size, or in this example, to an accuracy of approximately 0.0005 mm or 500 nm. The spatial resolution is proportionally higher as smaller distances are chosen.

C. Applications—the Sensor System in Use as Illustrative of Multiple Embodiments and Alternatives The inventors have determined that the sensor system is capable of use in various applications. With regard to monitoring structural integrity of bridges, bridge support cables, buildings, and similar structures, embodiments provide simultaneous data obtained from a distance (without need for physical contact with the object) from one or more, up to and including thousands, as desired, of test points.

With regard to monitoring for liquid and gas flow, embodiments detect the otherwise invisible motions in ventilation systems, leaks of clear gases, and turbulence from defects inside fluid piping, all at a distance without contact.

Embodiments utilized in biomedical applications include those wherein a rapid assessment of circulatory and/or respiratory function is achieved without the need for conventional probes being placed into physical contact with the subject. For example, signals in natural or artificial light include periodic processes that modify the surface of the object element. These signals can be used as a health monitor of a person's respiration, for example of an infant or an infirm person who may be predisposed to respiratory depression. The repetitive movement of the chest during inhalation and exhalation as part of respiration (breathing) is one such example of periodic processes. While breathing, the periodic movement of the chest is transferred to any clothing (e.g., shirt) or other covering (e.g., sheet) over the person's chest. Even slight displacement upon the surface of clothing or covering produces a contrast in features of the image, which is optically captured. In some embodiments, the respiration rates for separate individuals are detected simultaneously in the same scene.

Figure 2:
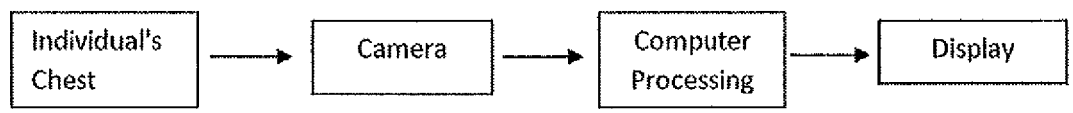
FIG. 2 is a schematic illustration depicting the data acquisition associated with use of the single-element passive optical sensor system, according to multiple embodiments and alternatives.

Accordingly, FIG. 2 shows a schematic illustration of an embodiment of a multi-element video system configured for the collection of respiratory data of an individual. Such embodiments allow for monitoring of an individual at any location on the body of an individual and under any conditions of illumination, such as for example, natural or artificial light, where the individual is in view.

Embodiments such as those shown in FIG. 2 utilize video technology in the camera combined with novel aspects associated with the processing and display in order to passively measure even minute motion in a scene. Embodiments provide that minor movement in the chest cavity is measured and respiration levels are determined. Thus, measurements are taken at a distance from the individual with no need for physical contact. This is a key consideration for monitoring an individual (e.g., an individual) around the clock. Using these embodiments, asleep or awake, the individual is not disturbed by the process of taking measurements, a factor that proves beneficial for recuperation in many cases.

The data obtained by the multi-element sensor system represent the information taken from a single pixel. This offers the simultaneous capture of multiple pixels that provide spatial resolution as well as increased signal-to-noise ratio. In one alternative embodiment, a video camera lens is situated in front of the individual's chest at a distance of about two-three meters, and the digital signal is sent to a processor in a computer through a standard interface, e.g., FireWire. The video is recorded to the hard drive as individual image frames that are processed and, optionally, stored in memory. The signal is acquired at a rate of 30 frames/second (fps) with the ability to increase to 300 fps if more dynamic range is needed. Embodiments provide software that is used to read the waveform and display the appropriate data. Data processing tools reject unwanted noise and background, such as, for example, modulation of the received signal from room lighting. The frames are processed by taking a pixel-by-pixel Fourier transform (not a spatial transform) along the time axis. The program then transforms the data space such that the third axis is frequency rather than time. Separate sample planes in the transformed space are images of the scene in distinct frequency ranges. These planes or images provide the specific frequencies of light occurring at the various location in the scene, which are then correlated to respiration rates.

Below, additional examples are provided, which illustrate alternative embodiments for various applications and uses for a system and methods for precision measurement of position, motion, and resonances. Examples 1, 2, 3, 4, 6, 7, 8, 9, 10A, 10B, 11, 12, and 14 were performed using a single-element sensor system. Examples 5, 13, 15, and 16 utilized a multiple element system. It will be understood that these and other examples are merely illustrative, and not meant as limiting. Other embodiments, and alternatives, and applications will be evident from reviewing the examples provided.

EXAMPLES RELATED TO STRUCTURAL INTEGRITY OF OBJECTS

Example 1

Structural Integrity of a Railroad Bridge

Figure 3:
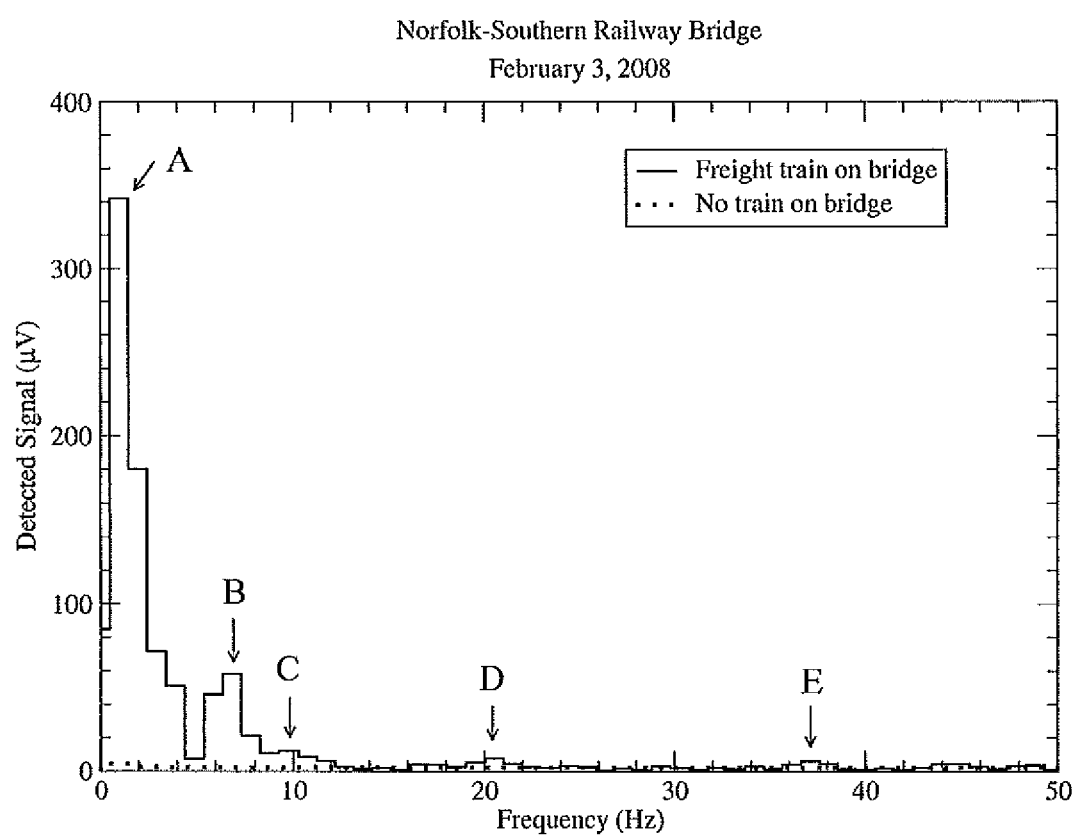
FIG. 3 is a graph plotting data for Example 1 (structural integrity of a railroad bridge), as illustrative of multiple embodiments and alternatives.

Natural light from a large structure, such as a bridge, carries a unique signature influenced by intrinsic resonances of its individual components. A steel railroad bridge, comprising a structure for carrying a freight rail line across 5 lanes of traffic, was analyzed. The motion of photons excited by a passing train is readily detected in the signal as shown in FIG. 3. In the figure, light from an area close to the center of the span was sampled with a single photodiode sensor and lens system. The sensor was located on an embankment opposite the bridge. The signal contained several resonances evident at low frequencies, which originated in the modulation of the natural light by slight motions of photons in the field of view. The resonant frequencies included approximately 1 Hz, 7 Hz, 10 Hz, 20 Hz, and 37 Hz, indicated in FIG. 3 with arrows A, B, C, D, and E, respectively. In this instance they are of the order of 1 part in 10,000 of the total signal.

Example 2

Structural Integrity of a Vehicular Bridge

Figure 4:
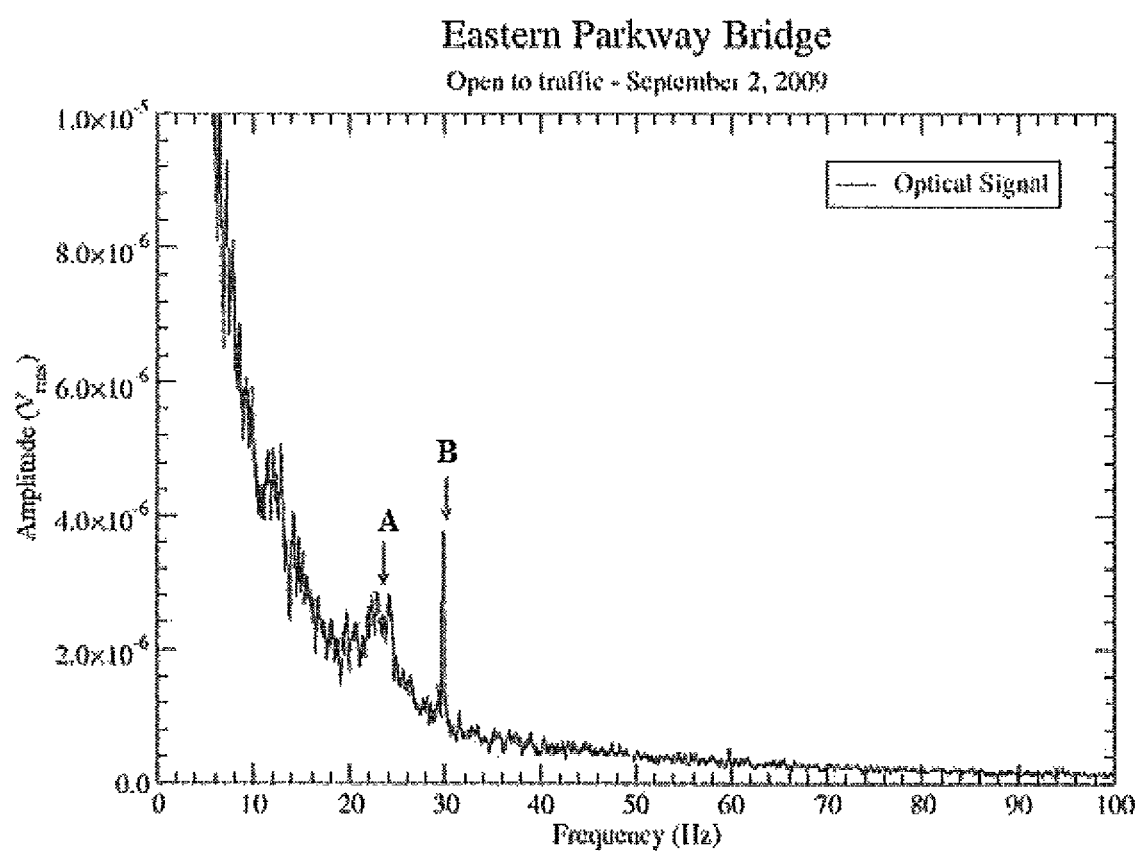
FIG. 4 is a graph plotting data for Example 2 (structural integrity of a vehicular bridge), as illustrative of multiple embodiments and alternatives.
Figure 5:
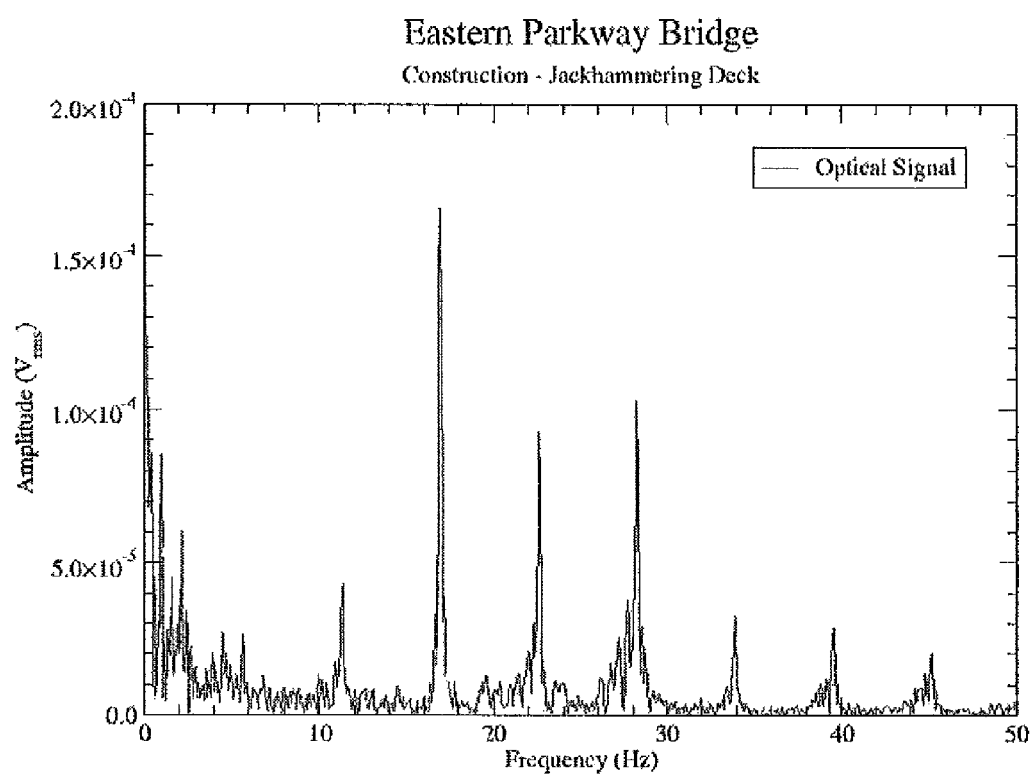
FIG. 5 is a graph plotting data for Example 2 (structural integrity of a vehicular bridge), as illustrative of multiple embodiments and alternatives.

A concrete vehicular bridge with supporting arches, comprising a structure for carrying four lanes of vehicular traffic, was analyzed. As shown in FIG. 4, an analysis of the light, consisting of photons, on the underside of the bridge using embodiments revealed distinctive resonances excited by vehicular traffic, such as at approximately 23 Hz and 30 Hz, as indicated by arrows A and B, respectively. FIG. 5 shows further data based upon vibration in the form of excitation during removal of the road under the bridge using jackhammers.

Example 3

Oscillating Rod—Sensor System for Remote Movement Detection

Figure 6:
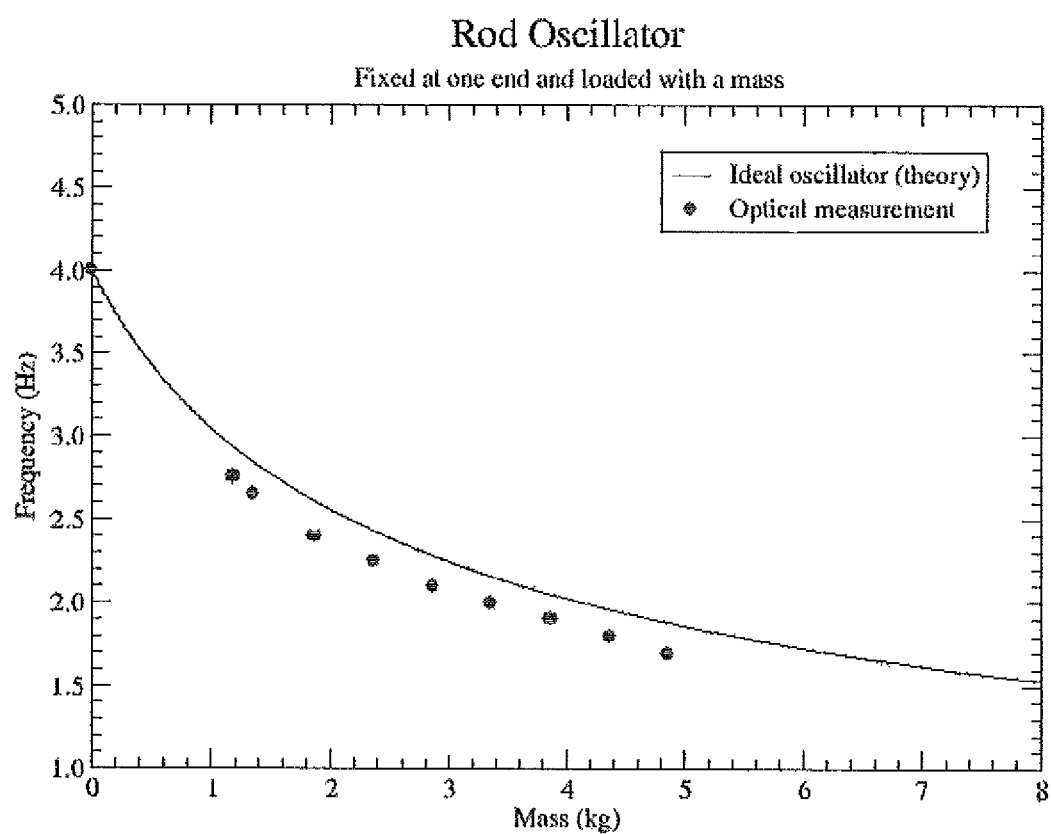
FIG. 6 is a graph plotting data for Example 3 (oscillating rod), as illustrative of multiple embodiments and alternatives.

A standard rod oscillator, such as that utilized in a typical laboratory, was analyzed to detect a change in the field of view that alters the light level around an object element. Such changes originate through a variety of identified physical processes, including translation of the object element (a rod)

across the field, or along the line of sight. In this example, the object element was an oscillating rod clamped with a node at its base and free to vibrate in response to hand tapping. The oscillating rod used was a steel cylinder 2.5 cm in diameter and 2 meters long, anchored to the floor in a vertical orientation, with a single resonant frequency determined by its physical properties. A mass was loaded upon the oscillating rod. The sensor system and light source were on a laboratory table positioned several feet away from the oscillating rod. The rod was then stimulated to have a very small amplitude of periodic motion. As shown in FIG. 6, periodic motions of the rod were sensed following the stimulation, and the system detected the frequencies of the rod as it underwent simple harmonic motion.

Example 4

Other Structures—Lamppost in Contact with Bridge

Figure 7:
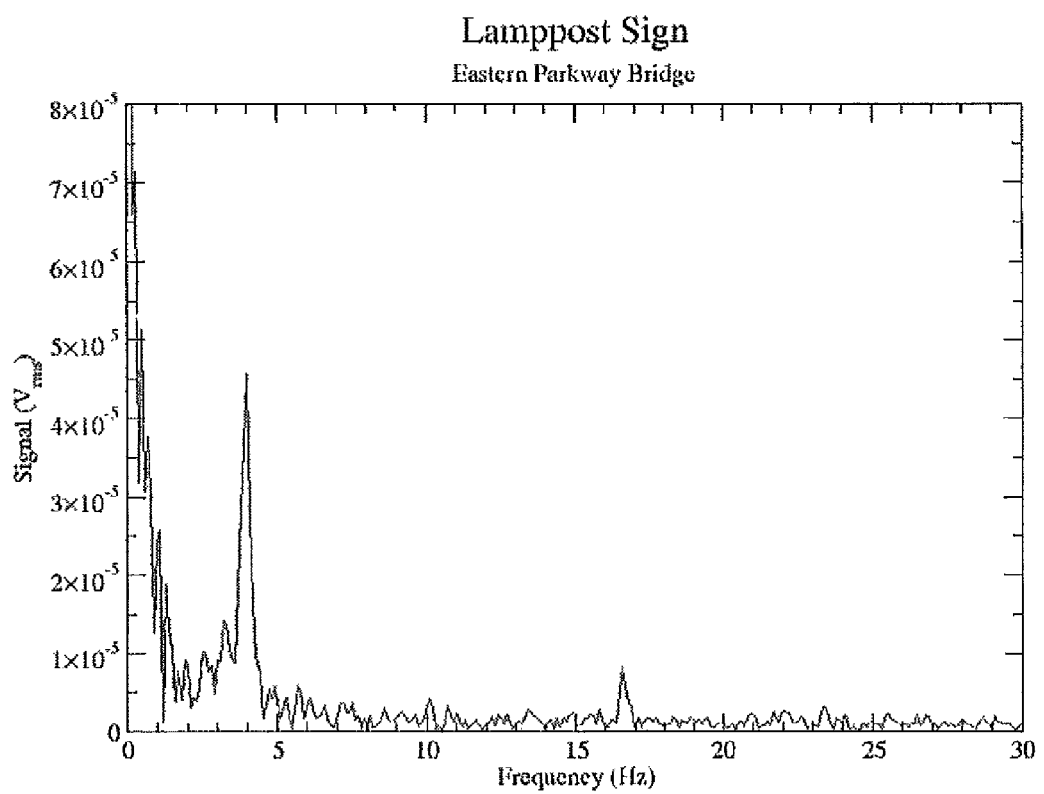
FIG. 7 is a graph plotting data for Example 4 (lamppost in contact with bridge), as illustrative of multiple embodiments and alternatives.

The vehicular bridge of Example 2 included lampposts with signs and flags attached to a concrete railing. Wind load and vehicular traffic produced vibration in the lampposts, thereby exciting a metal sign attached to the lamppost to vibrate as well. Data from the sign vibration, as measured at a distance of about 40 meters from the object element, show the unique signature of low frequency resonance of the lamppost at 4 Hz, and higher frequencies intrinsic to the sign. The sub-Hz component of the signal comes from a typical metropolitan seismic background, including traffic on the bridge. Thus, FIG. 7 graphs the transform spectrum below 30 Hz, in which resonances of the sign attached to the lamppost modulate an image in natural sunlight. In this example, frequencies at 4 and 17 Hz, respectively, are excited by traffic and wind.

Example Related to Detecting Motions of a Surface

Example 5

Drum Head Resonance

Figure 8:
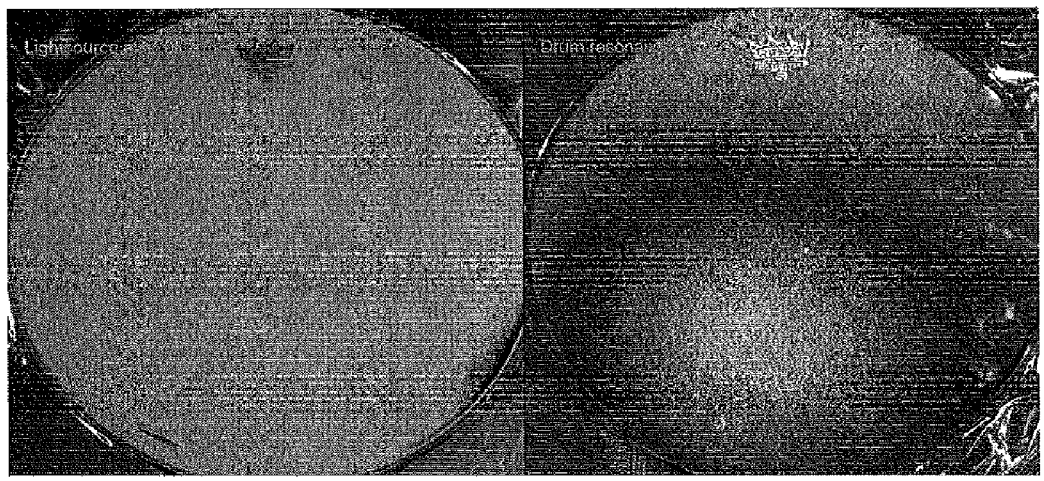
FIG. 8 shows Eigenimages of a drumhead that was illuminated and exposed to resonance vibration at two frequencies as discussed in Example 5, as illustrative of multiple embodiments and alternatives.

A floor tom drum with standard white matte "batters" (drumheads) on both ends was tensioned to tune it to resonance, in order to analyze surface motions on a relatively small scale. The drumhead "batter" on one side was uniformly illuminated by an incandescent lamp powered by AC line voltage, excited to vibrate by resonance, and recorded for 1 second at a 500 Hz frame rate. Images of light were then processed utilizing software according to present embodiments to extract Eigenimages in two frequencies, 120 Hz and 86 Hz, respectively, as shown in FIG. 8. The former is the modulation frequency of the illumination. The latter is the resonant frequency of the drumhead, such that a single impulse (a hand strike) to one batter caused the opposite batter to vibrate at 86 Hz. The drum batter was measured with a laser Doppler vibrometer to verify the frequency of the drum head. Areas that are white in this image have the greatest surface motion, and these areas produce the most modulation.

Figure 9:
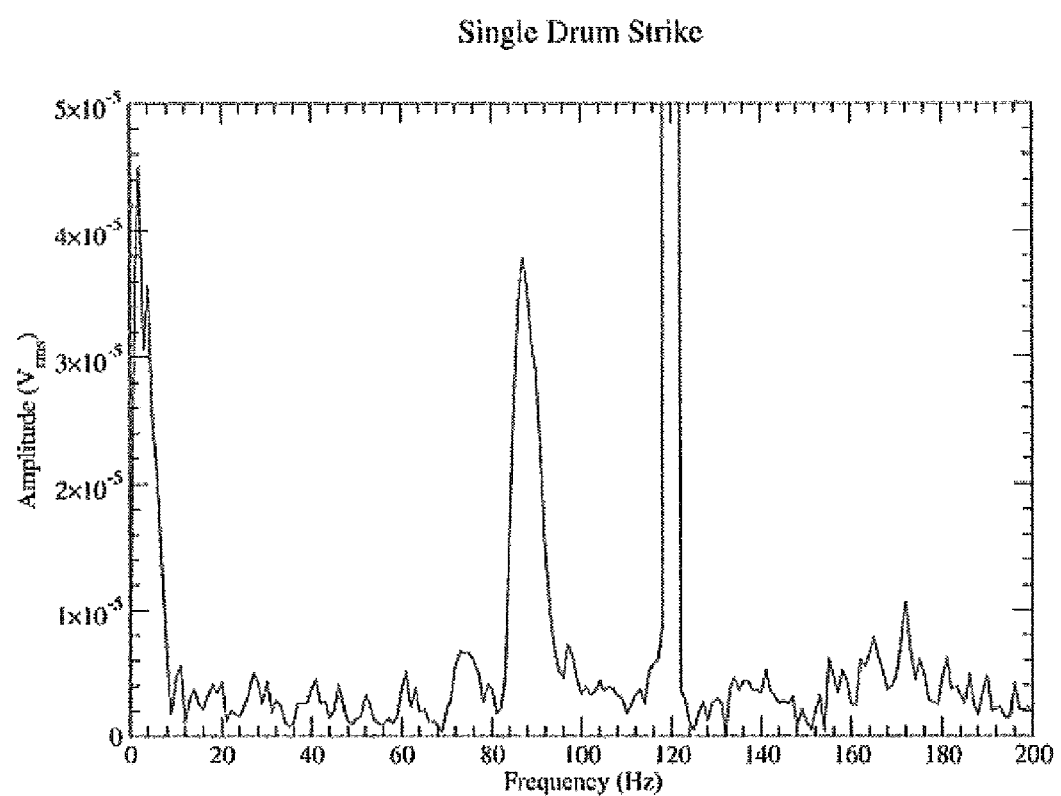
FIG. 9 is a graph plotting data for Example 5, as illustrative of multiple embodiments and alternatives.

At both frequencies of light modulation, light from the batter was collected, sensed with a low-noise photodiode, and digitized with a 20-bit dynamic range system. The low frequencies present in the signal are shown in FIG. 9. The signal includes the two principal components at 0 Hz and 120 Hz. In addition, there is a signal at 86 Hz corresponding to the acoustical oscillation of the drum, and to the frequency of the surface motion of the batter. The 86 Hz signal arises because the tensioned surface has nodes and antinodes corresponding to membrane resonances.

While the single photodiode collects light from the entire drum batter, small variations in the signal, for example due to sound waves interacting with the surface, are distinguished by principal component analysis. The pattern of surface motion is visualized by recording a sequence of images of the surface, rather than integrating light from the entire surface as a whole. In this example, a high speed camera captured 500 frames with 2 millisecond cadence (oversampling at 500 Hz). The resulting "data cube" had two dimensions of spatial imaging and one dimension of time, and then a new data cube was created with a frequency axis replacing the time axis. Images were extracted, one integrating 0 to 1 Hz, and the other integrating 119 to 121 Hz in the frequency domain, that both showed a uniform batter surface. The Eigenimage at 86±2 Hz in FIG. 8, by comparison, was nonuniform with the pattern due to resonant motions of the membrane (i.e., the drumhead).

EXAMPLES RELATED TO RESONANCES IN MACHINERY

Example 6

Detection and Identification of Resonances in Machinery

Figure 10:
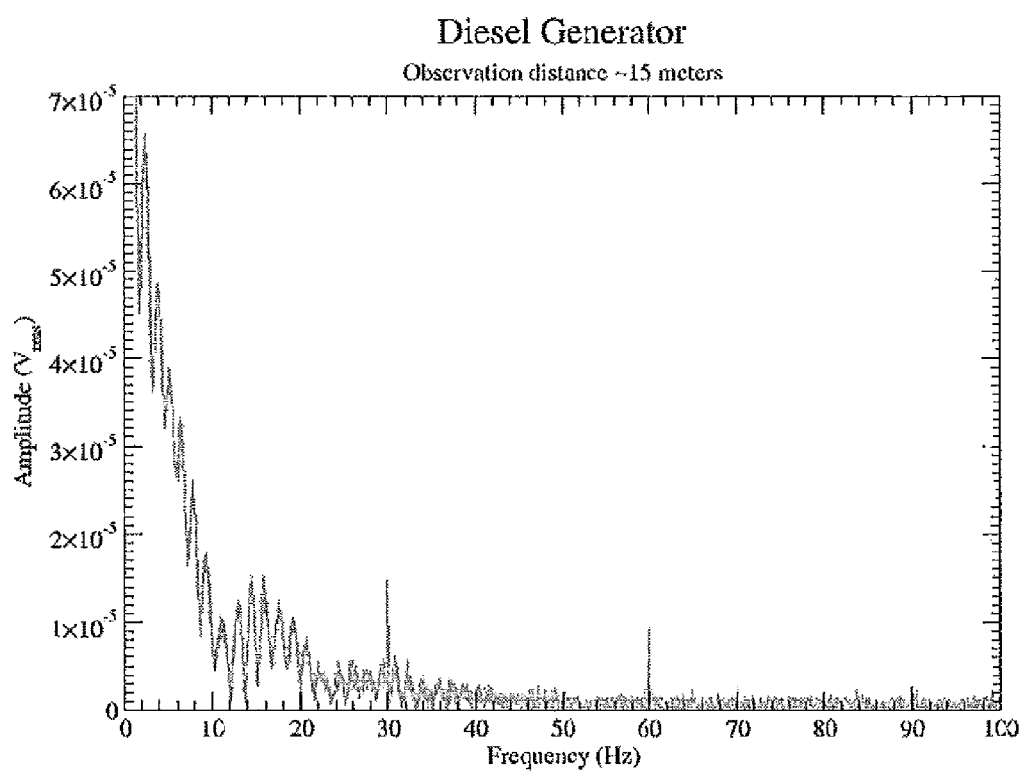
FIG. 10 is a graph plotting data for Example 6 (resonances in machinery—power generator), as illustrative of multiple embodiments and alternatives.

Examples were tested on a larger scale than for Examples 3 and 4, including analyzing images revealed when surfaces of an emergency generator were excited by mechanical motions. During use at an engine speed of about 1800 revolutions per minute (rpm), the generator enclosure moved, which was also marked by the revolution of the motor causing the housing to vibrate. FIG. 10 shows many low frequency components, which are associated with the vibration of the housing due to the revolution of the motor. There are two very sharp peaks, however: one at 30 Hz (corresponding to the engine speed of about 1800 rpm) and the other at 60 Hz.

Example 7

Detection and Identification of Resonances Produced by HVAC Fans

Figure 11:
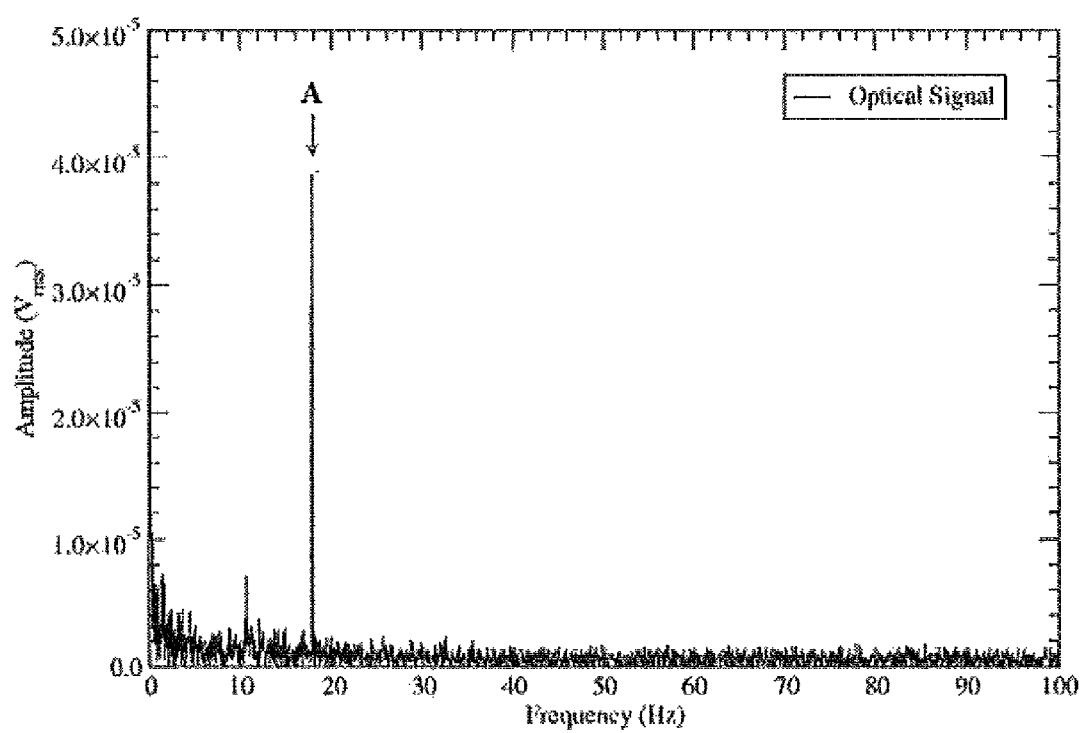
FIG. 11 is a graph plotting data for Example 7 (building HVAC units), as illustrative of multiple embodiments and alternatives.

A single-element sensor system was used to characterize the motion associated with air handling fans in the ventilation stacks in a building's HVAC system. The particular HVAC system uses forced air movement for venting harmful and noxious vapors from chemistry laboratory rooms within the building. In this example, rather than analyzing an edge of the ventilation stacks, motion was analyzed with embodiments of the present optoelectronic system to integrate and digitize light from a surface of the stacks, by sampling the intensity of the pixel over time. The graph of FIG. 11 shows the frequencies measured in connection with the ventilation stacks of the HVAC unit, with arrow A indicating that significant motion was sensed at approximately 17 Hz, which corresponded to a fan motor operating at about 1020 rpm. Fume hoods, such as that of the present example, typically operate quietly at lower speeds, compared to generators, such as that of the previous example. Thus, the lower rpm of the fan motor, compared to the generator, was expected.

Examples Related to Turbulent Flow of a Gas

Example 8

Detection of Flow Turbulence Associated with Transmission of Warm Air

Figure 12:
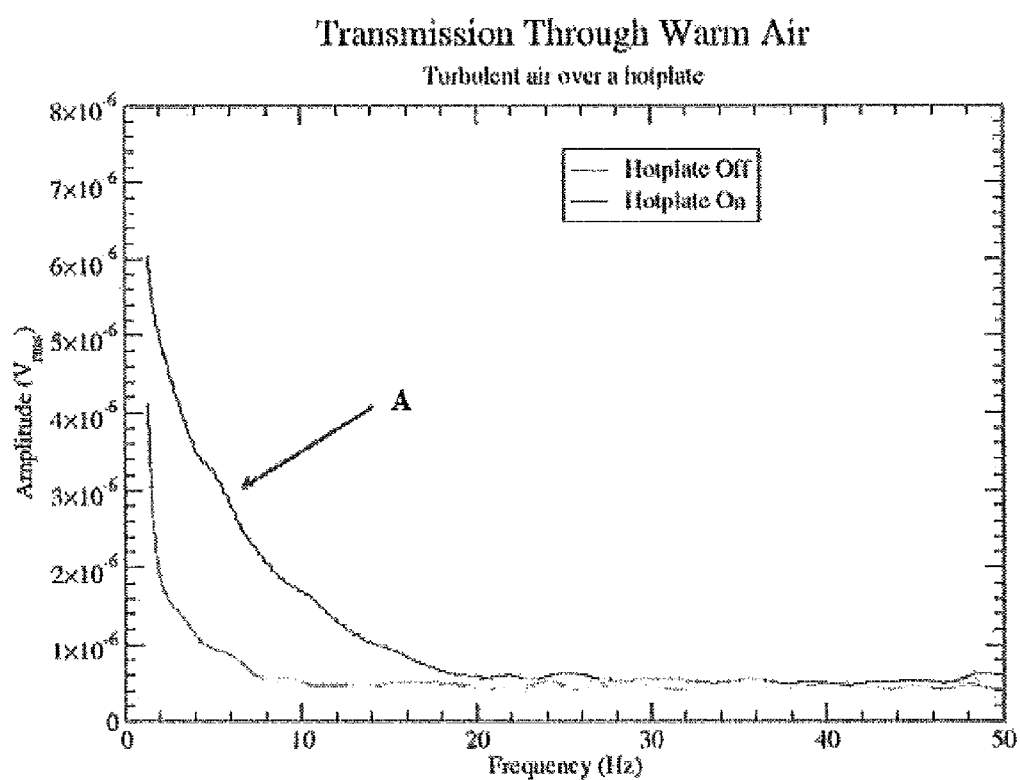
FIG. 12 is a graph plotting data for Example 8 (turbulent air over a hotplate), as illustrative of multiple embodiments and alternatives.

When light passes through a transparent gas, such as air, it is refracted by density inhomogeneities. If the inhomogeneities are dynamic (or if the line of sight is changing, which is not the case in this example) then refraction modulates the signal received. For a transparent, slowly evolving turbulent medium and a static sight line, modulation of the transmitted light is generally determined by two factors: (1) the spatial scale of the turbulence; and (2) the rate at which the medium flows through the sight line. In the present example, turbulent air flow was produced through convectively unstable warm air (a gas) being passed over a laboratory hot plate. Turbulent air flow is inherently random, which produces the low-frequency components in the results shown in FIG. 12. Arrow A indicates the results when the hot plate was in operation.

Example 9

Turbulent Air from Physical Plant Steam Exhaust

Figure 13:
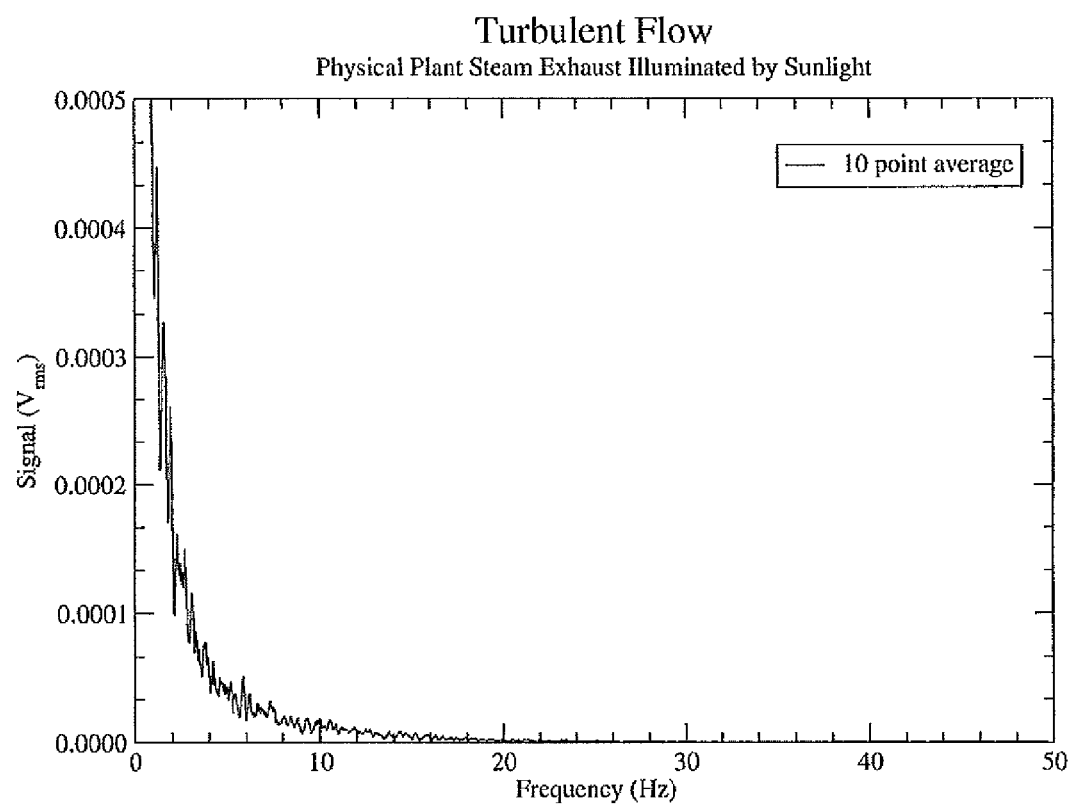
FIG. 13 is a graph plotting data for Example 9 (turbulent air from physical plant steam exhaust), as illustrative of multiple embodiments and alternatives.

The signal from steam flowing from the exhaust of a heating facility at a university building was measured at a distance of about 115 meters. Measurements were taken in daytime, with sunlight filtered by high clouds, thereby providing an uniform source of illumination upon the steam from all directions. As shown in FIG. 13, signal strength rises rapidly at lower frequencies due to the presence of large-scale structure in the turbulent field, providing a signature of turbulent flow. Thus, this example demonstrates that transmitted light is modified by dynamic changes—i.e., turbulence—in the medium, in which variations are seen in a spatially selected region of the turbulent cloud of exhaust steam.

Examples Related to Liquid and Gas Flow in a Pipe

Example 10A

Detection of Fluid Flow in a Pipe—Cooling Tower

Figure 14:
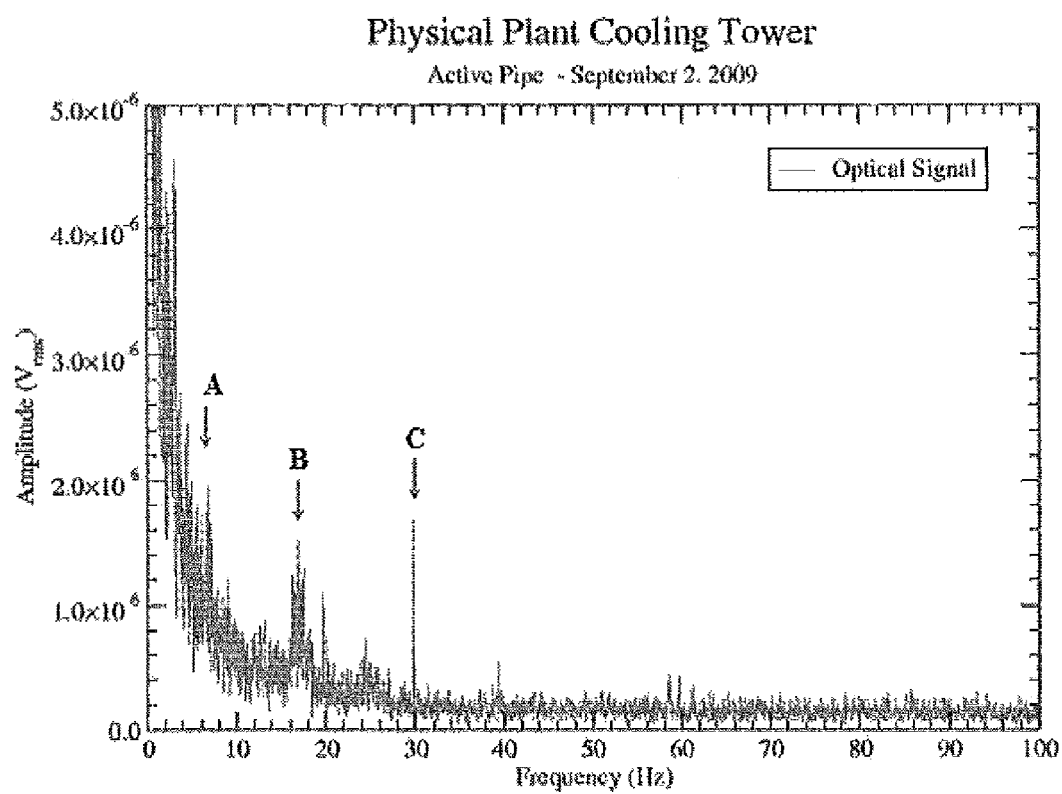
FIG. 14 is a graph plotting data for Example 10A (Detection of fluid flow in a pipe—cooling tower), as illustrative of multiple embodiments and alternatives.

Fluid flow in a pipe can be evaluated by measuring the turbulence originating from the flow itself, as a function of pipe surface displacement. When gas or liquid is transmitted through a pipe and the flow is not smooth, the disruptions in the flow result in subtle motions of the pipe surface, in which turbulence produced a unique structure in the low frequency portion of the spectrum when the intensity of the pixel was measured over time. With a sensor positioned about 21 meters from a cooling tower having a pipe through which water is delivered, it was determined that natural daylight was modulated by motion of the pipe in response to non-smooth flow in the middle portion of one length of pipe. FIG. 14 plots data from the analysis of the signal from a pipe feeding a cooling tower, and it shows that such pipe carries a signature based on turbulent flow and pipe resonances. The data in the graph demonstrated a rise of signal at low frequencies due to turbulence, as indicated by arrow A, in addition to resonances that most probably originated within the pipe or its structure, as indicated by arrow B. The sharp single frequency at 30 Hz (about 1800 rpm) indicated by arrow C is associated with a pump in the building.

Example 10B

Detection of Fluid Flow on a Pipe—Gas Pipeline

Figure 15:
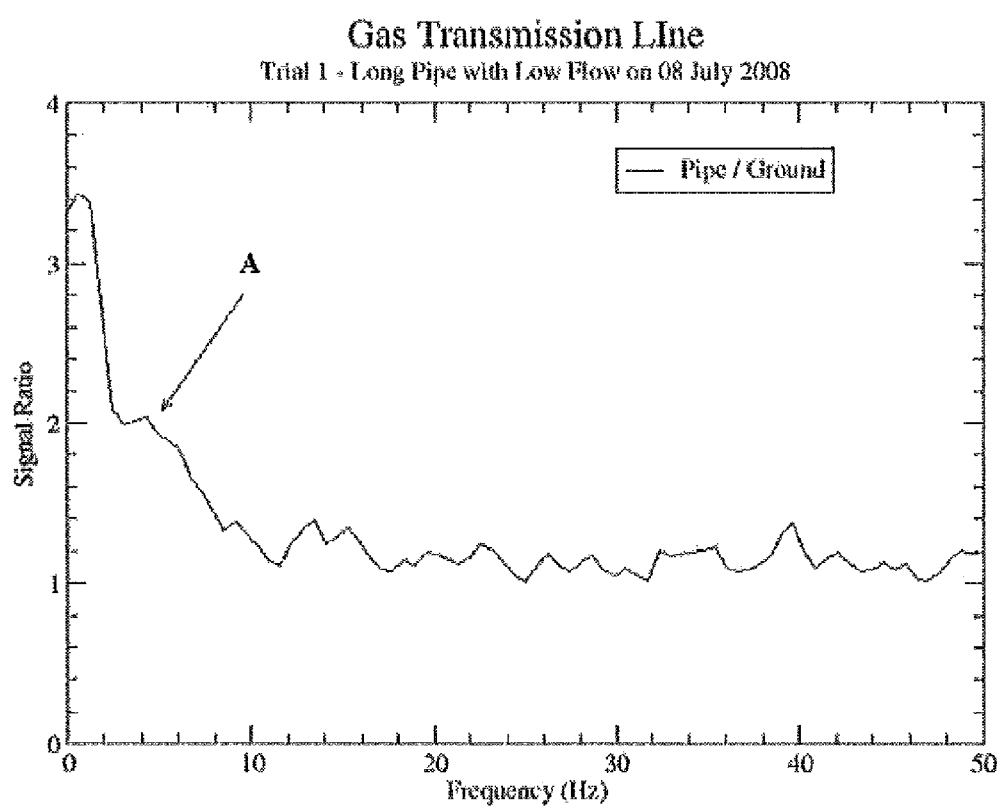
FIG. 15 is a graph plotting data for Example 10B (Detection of fluid flow in a pipe—gas pipeline), as illustrative of multiple embodiments and alternatives.

An above ground gas pipeline, including a typical pipeline switching station for diverting gas to underground storage, was used for site testing of flow detection. On an overcast day, sunlight through clouds illuminated the painted surface of the pipe. Gas flow through the pipeline was detected by remotely sensing light with sensors having a wide dynamic range. FIG. 15 demonstrates that a low-frequency component appeared in the signal produced, at about 4 Hz, as indicated by arrow A, at a time when it was confirmed that gas was flowing through the pipeline. The signal produced was not present in the comparable ground signal, and it was determined that no turbulence was detected from the ground. The signal from the pipeline was thus sensed remotely from a distance, using natural light, and without physical contact with the pipe.

Examples Related to Biomedical Applications and Monitoring

Example 11

Pulse Pressure Profile—Radial Pulse (Wrist)

Figure 16:
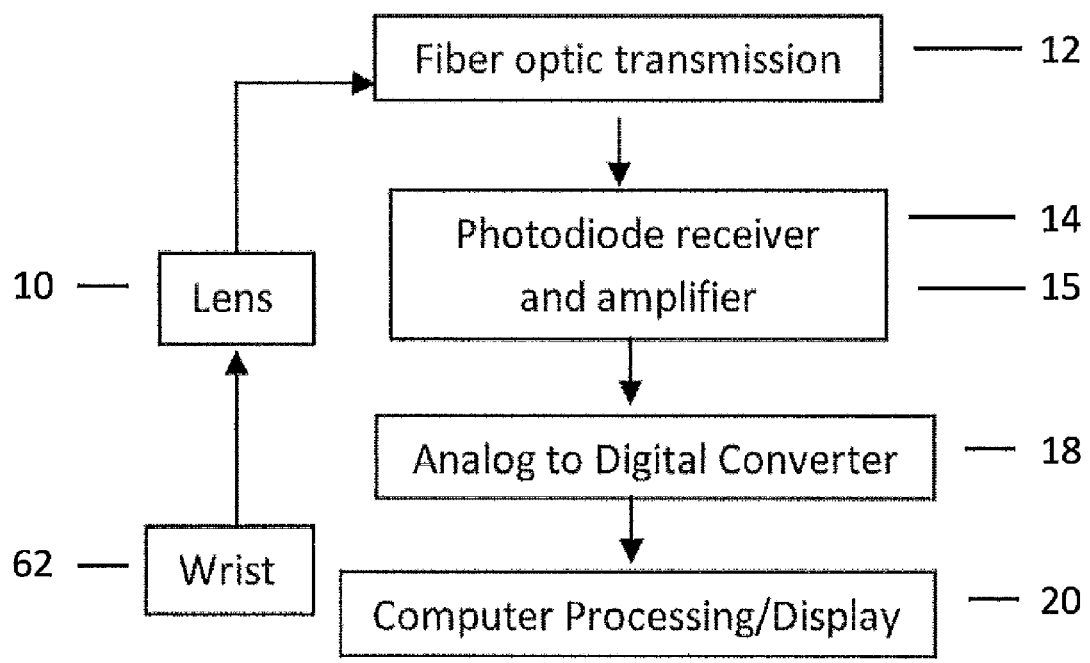
FIG. 16 is a schematic diagram of a single-element optical sensor operably coupled by a fiber optic cable to remote electronics for determining blood pulse profile as discussed in Example 11, as illustrative of multiple embodiments and alternatives
Figure 17:
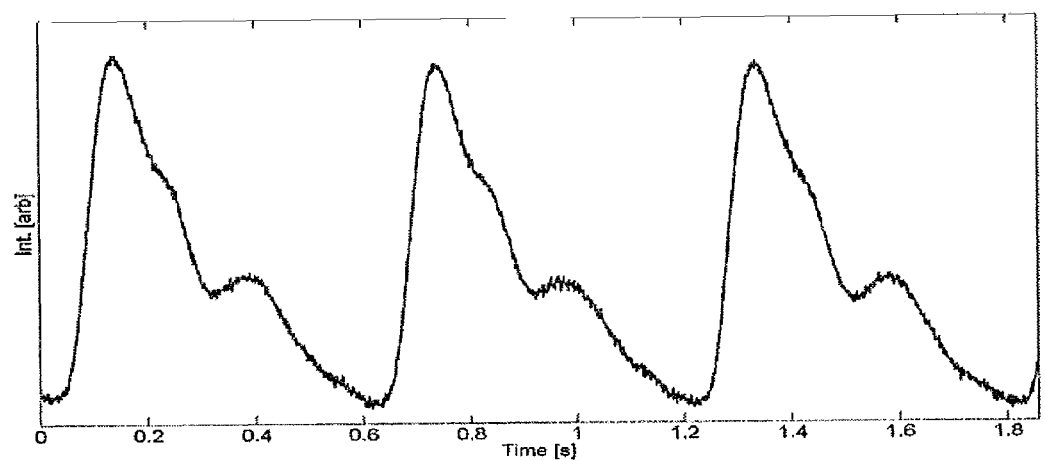
FIG. 17 is a graph plotting data for Example 11 (pulse pressure profile), as illustrative of multiple embodiments and alternatives.
Figure 18:
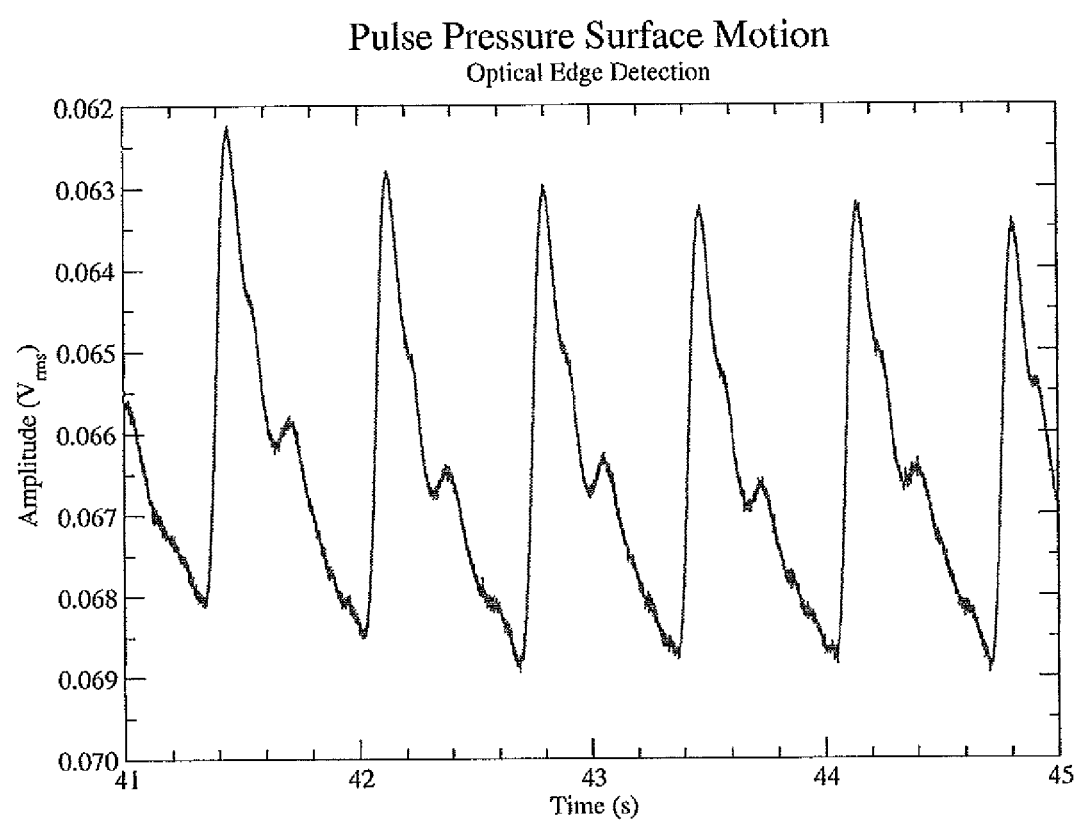
FIG. 18 is a graph plotting data for Example 11 (radial pulse pressure profile), as illustrative of multiple embodiments and alternatives.

An individual's radial blood pulse was first measured at the wrist with the individual in a normal sitting position with arm relaxed, resting on a surface to the individual's side at about waist level. For comparison, a single-element optical sensor system comprising a single-element optical sensor coupled by a fiber optic cable to remote electronics, according to embodiments described herein, was then utilized for determining the individual's blood pulse profile. As illustrated in FIG. 16, lens 10 was provided for focusing an individual's wrist 62 onto optical fiber 12. Photodiode 14 was optically coupled to the output of optical fiber 12, in order to acquire a signal from the wrist 62, and was integrated with amplifier 15. The signal was then matched to converter 18, which was peripheral to processor 20. Temporal data from the system was used in producing a pulse waveform (FIGS. 17 and 18), as a recording of modulations due to skin surface motion over the radial artery, using edge-feature detection. Further, Eigen-frequency analysis yielded information about heart rate and secondary processes associated with vascular system response to the pressure pulse. FIGS. 17 and 18, respectively, provide data regarding the displacement signal of skin surface motion on the wrist caused by the blood pulse waveform in the radial artery. A very high signal-to-noise ratio in the repetitive profiles of FIGS. 17 and 18 was noted. FIG. 18 plots the data from the signal obtained at a region on the wrist, at the point where a pulse would be sensed if physical contact were made. The data produced by the optical sensor system was consistent with the measured pulse.

With reference to FIG. 16 and the details of the single element optical sensor system used in this example, a small lens 10 (16 millimeter focal length) was situated above the individual's wrist 62 at a distance of approximately 10 cm. The lens 10 was coupled to fiber 12 that sends the signal to photodiode 14 and amplifier 15. That amplified sensor signal was then sent to analog-to-digital converter (ADC) 18 that digitized the signal to 24-bits. The ADC 18 was connected to computer processor 20 through a USB interface that allowed the signal to be imported into a software package. The signal was acquired at a rate of 1024 samples/second with the ability to increase to 100,000 sample/second if more dynamic range was needed. Software was then used to interpret the waveform and to display the appropriate data. As desired, data processing tools were used to reject unwanted noise levels, such as for example, modulation of the received signal from room lighting or shaking of the hand.

Example 12

Pulse Pressure Profile—Carotid Pulse (Neck)

Figure 19:
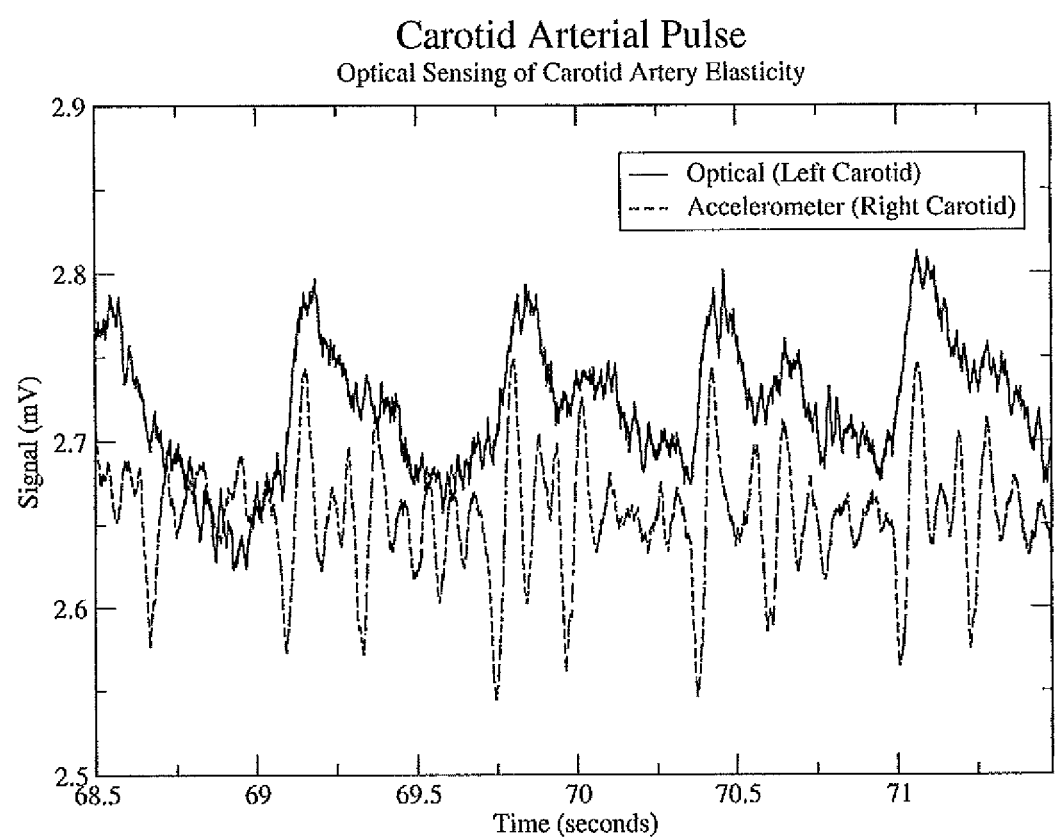
FIG. 19 is a graph plotting data for Example 12 (optical sensing of carotid artery), as illustrative of multiple embodiments and alternatives.

With the individual in a normal upright position, the measured data was collected and processed for the left carotid artery in the same manner as taught for blood pulse profile above, except that the lens on the optical sensor was situated so that the carotid artery was placed into view, at a distance of about 10 cm. Controlled illumination was provided to detect relatively subtle effects in spatially resolved images. For comparison, simultaneous measurement on the left and right side occurred, with signals for the right carotid artery being obtained using a conventional accelerometer. As shown in FIG. 19, the results were consistent for both methods. The measurement on the left side was a function of skin elasticity and movement in response to carotid arterial pressure, being evaluated and measured at a distance without the need for physical contact with the individual, thus without causing a change in the pressure being measured through physical contact.

Besides the radial and carotid arteries, other locations on an individual are also suitable for measuring a pulse. These may include, but are not necessarily limited to, the brachial, femoral, tibial, and popliteal arteries.

Example 13

Measurement of Respiration of an Individual

Figure 20:
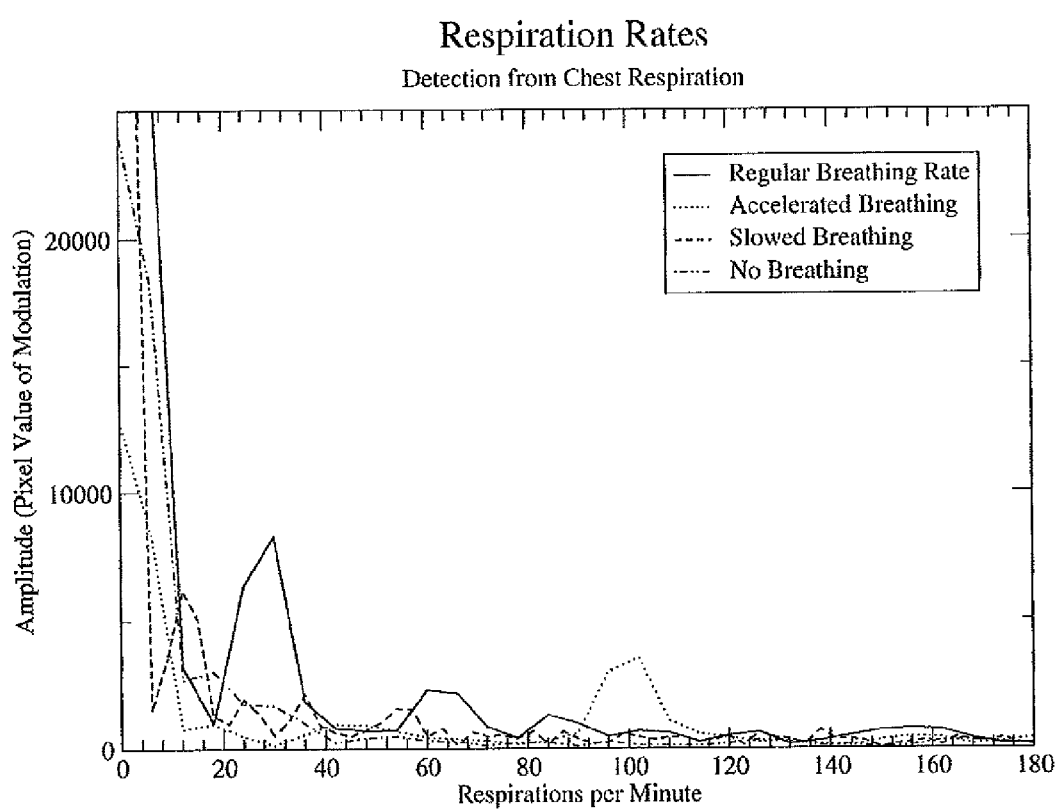
FIG. 20 is a graph plotting chest respiration rates data for Example 13, as illustrative of multiple embodiments and alternatives.
Figure 21:
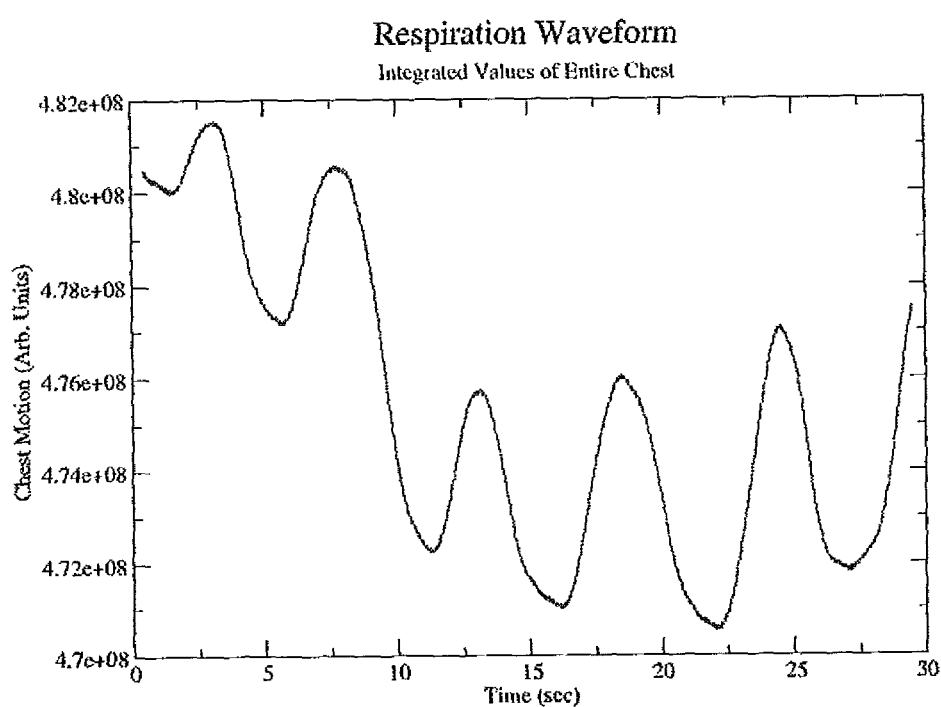
FIG. 21 is a graph plotting a respiration waveform for Example 13, as illustrative of multiple embodiments and alternatives.
Figure 22:
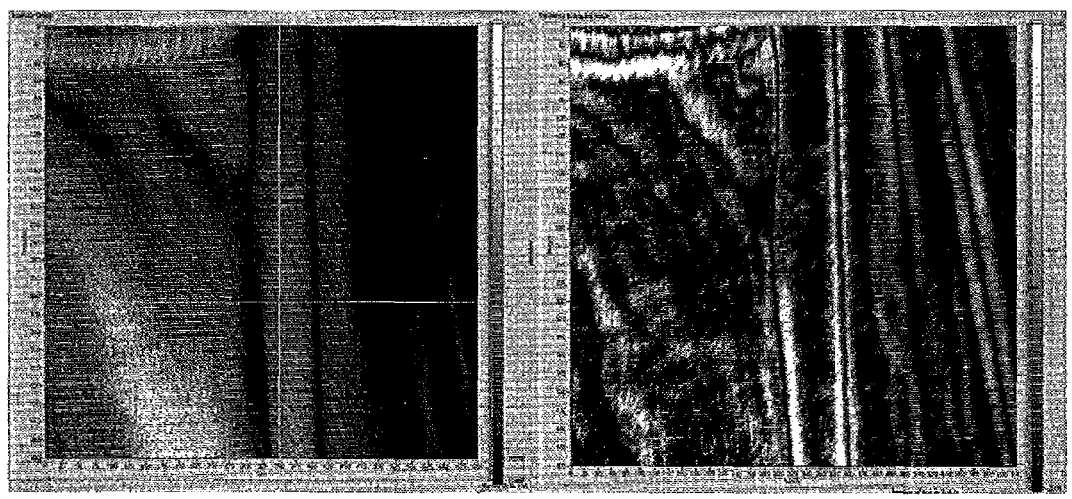
FIG. 22 shows Eigenimages depicting respiration levels seen through a common T-shirt resulting from respiration data acquired in connection with Example 13, as illustrative of multiple embodiments and alternatives.
Figure 23:
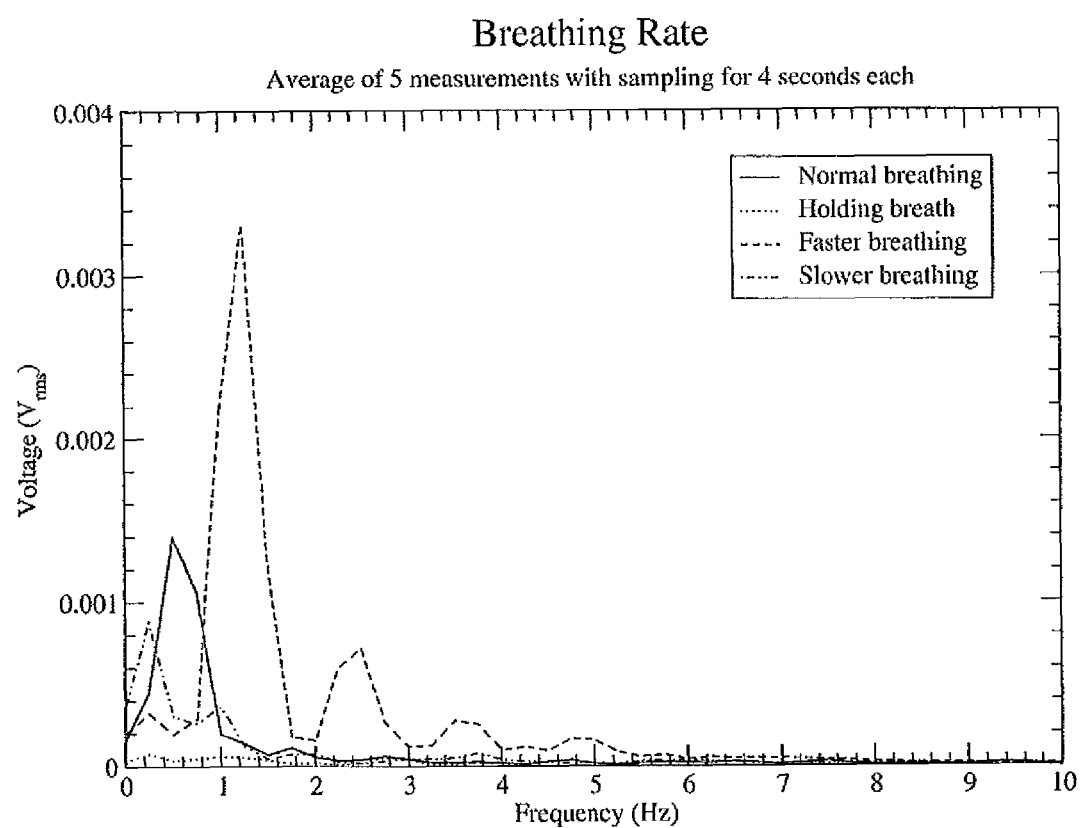
FIG. 23 is a graph plotting breathing rate data for Example 13, as illustrative of multiple embodiments and alternatives.
Figure 24A:
FIG. 24A shows an Eigenimage of a respiration rate based upon data acquisition associated with Example 13, as illustrative of multiple embodiments and alternatives.
Figure 24B:
FIG. 24B shows an Eigenimage of a respiration rate based upon data acquisition associated with Example 13, as illustrative of multiple embodiments and alternatives.

A multi-element video system was configured for the collection of respiration data, according to embodiments described in connection with FIG. 2. The individual's respiration rate was measured in a normal comfortable lying position on a bed. Respiration rates were measured for four different cases of breathing patterns: regular breathing, accelerated breathing, slowed breathing, and holding of the breath. FIG. 20 provides respiration rates that were generated using the multi-element optical sensor, for each of the four breathing patterns. In turn, the integrated values for the entire chest are shown in FIG. 21 as a respiration waveform. FIG. 22 provides Eigenimages of respiration levels as detected through a common shirt wherein a comparison of a time domain image (left) and frequency domain image (right) for a white T-shirt was made. The image on the right shows a processed respiration rate of 24 breaths per minute. The image on the left is a single frame from the video data. FIG. 23 uses the data collected and shown in FIG. 20, regarding respiration rates, but provides this as an average of five measurements taken with sampling conducted for four seconds in each case. FIG. 24A depicts a respiration rate of 8 breaths per minute, and FIG. 24B depicts a respiration rate of 12 breaths per minute. Images FIGS. 24A and B were processed from the same data set and acquired simultaneously.

Example 14

Sensor Calibration of Optical Signal

Figure 25A:
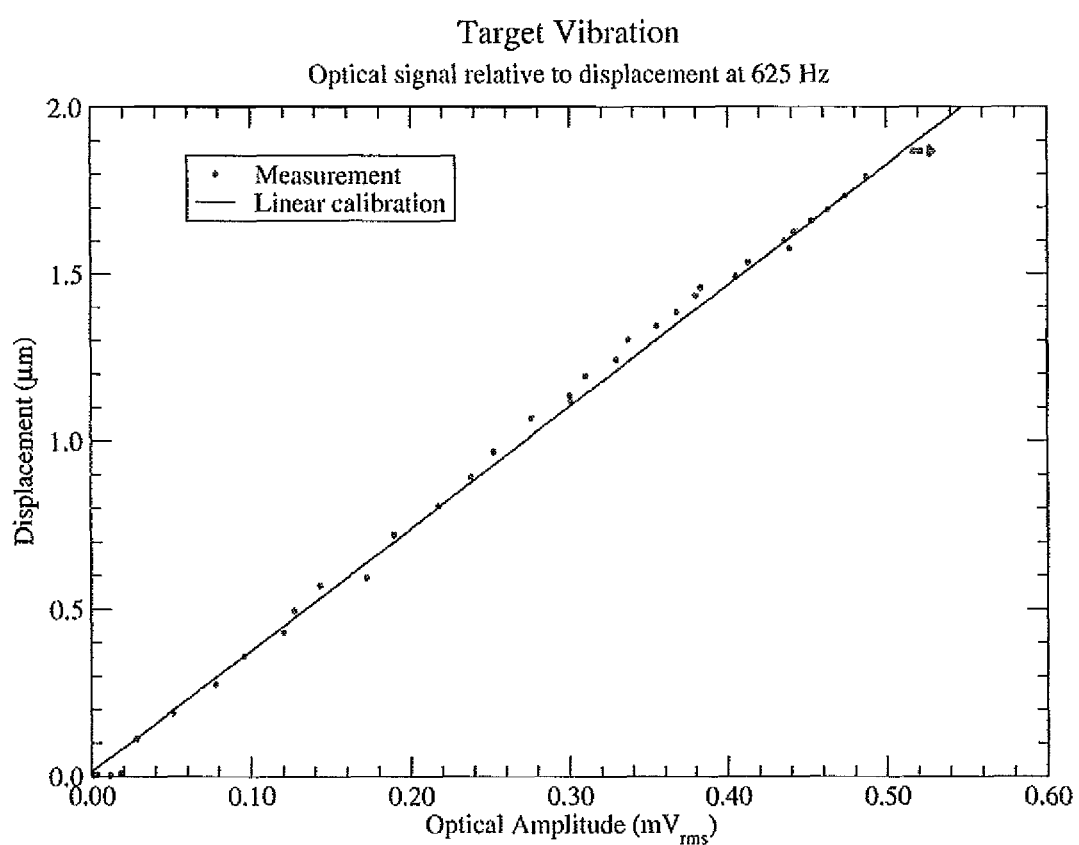
FIG. 25A is a graph plotting calibration data for Example 14, as illustrative of multiple embodiments and alternatives.
Figure 25B:
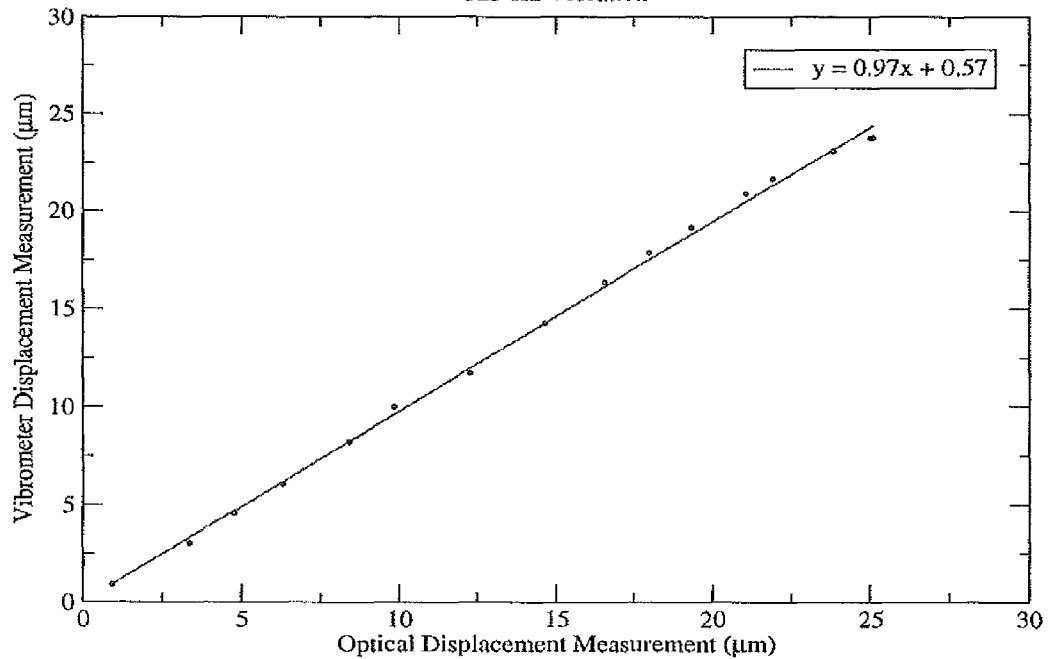
FIG. 25B is a graph plotting calibration data for Example 14, as illustrative of multiple embodiments and alternatives.

Calibration of a single-element optical sensor system was achieved by measuring modulation with natural light illuminating a scene. The object element was a black and white line printed on a sheet of paper attached to a stereo speaker. The position of the speaker, the paper, and, therefore, the line, were displaced during normal use. In both FIG. 25A and FIG. 25B, absolute positioning and changes of position of the line were determined through laser Doppler vibrometry, independently of the sensor system. The present example indicates that modulation of natural light, in response to amplitude associated with periodic displacement of the speaker, as measured by the sensor, was proportional to the amplitude associated with periodic displacement of the speaker as determined with the vibrometer. In the graph of FIG. 25A, the selected light modulation frequency was 625 Hz, and it was 325 Hz in the graph of FIG. 25B.

Both graphs show an exact linear correlation with a slope substantially of 1, with respect to measurement of displacement using the multiple element sensor system, as compared independently to values determined through laser Doppler vibrometry. Signal modulation was proportional to the amplitude of the periodic displacement derived from Doppler velocimetry within the range from 0.1 to 1.8 microns for which the velocimeter yields data. At the lower end of the range, displacement of the surface was smaller than the wavelength of the light used to measure its motion. Nevertheless, as a means to calibrate embodiments, as desired, the present example shows that change in position of a high-contrast feature in the scene may be tracked accurately with known techniques associated with laser Doppler velocimetry, and that such change was sensed unambiguously in the natural light signal. The relationship thus allows for the sensor to be calibrated by a single simultaneous measurement of absolute displacement.

Example 15

Multi-Dimensional Depiction of Resonances—Time and Frequency

Figure 26:
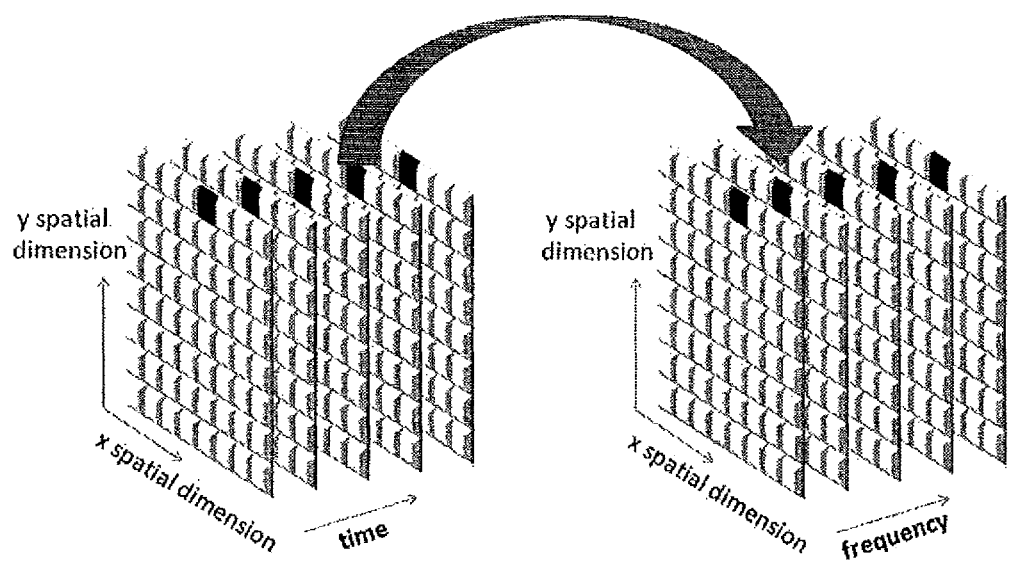
FIG. 26 shows a slice of a data cube acquired in connection with Example 15, as illustrative of multiple embodiments and alternatives.

In the present example, high-speed parallel processing of data was used to extract information in real time. A two-dimensional scene was recorded with high dynamic range. The very dense stream of data produced was spatially resolved by associating each element or pixel in the scene with a spectrum of frequencies derived from the modulation of the light detected during an integration period. Thus, data that included the integration period was represented in three dimensions as a cube, in which two of the dimensions were the spatially resolved scene, and the third dimension was used for extracting Eigenimages. FIG. 26 provides a depiction representing the creation of an x-y-t data cube (x and y are spatial dimensions, and t is Time) with transformation to a similar 3-dimensional data cube where Time is replaced by Frequency, through known methods and techniques such as Fast Fourier Transform. In the example, a 60 Hz incandescent lamp was used for ambient scene illumination, and the scene was recorded with a high frame rate camera. The plane at the far left side of each cube is the DC level from the unmodulated component of the natural lighting. A 120 Hz plane at the far right of each cube is the black/white strip of the object element seen in natural light. A 10 Hz plane was chosen as the frequency of interest based upon principal component analysis, which illustrates the harmonics associated with the modulation of light due to physical movement of the object element. Other elements in the scene could be processed in the same fashion, element by element. Based upon the duration of sampling, repeated windows will produce new cubes for an evolving three dimensional representation of the scene.

Example 16

Vibration of Bridge Support Cables

Figure 27:
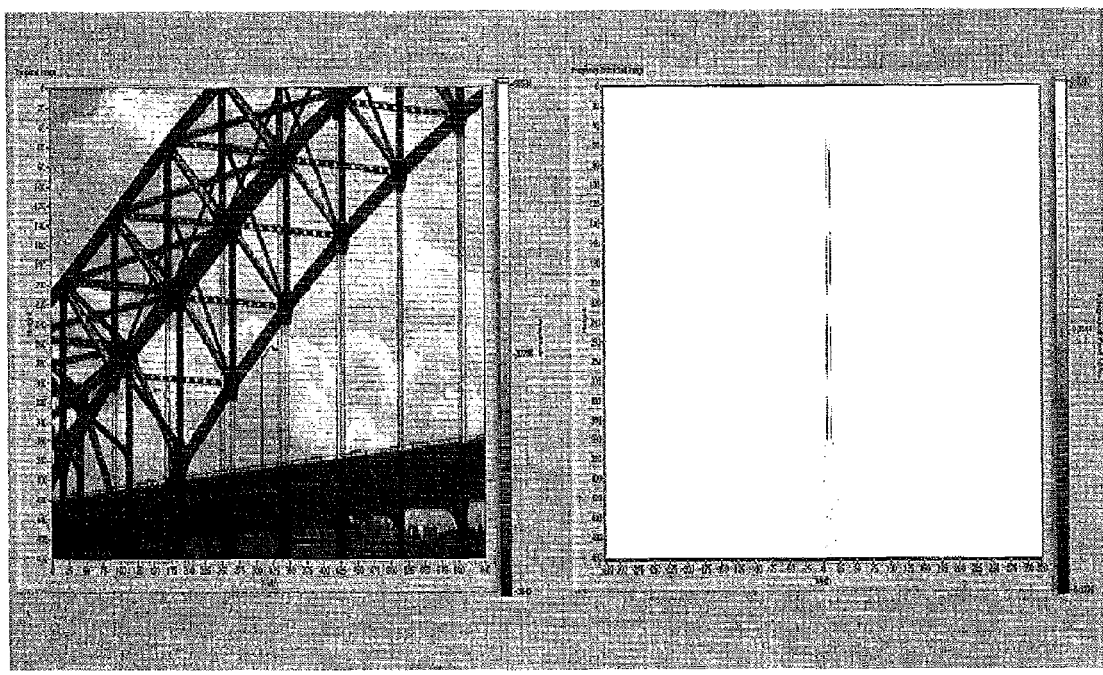
FIG. 27 is a graph plotting plotting data for Example 16, as illustrative of multiple embodiments and alternatives.
Figure 28:
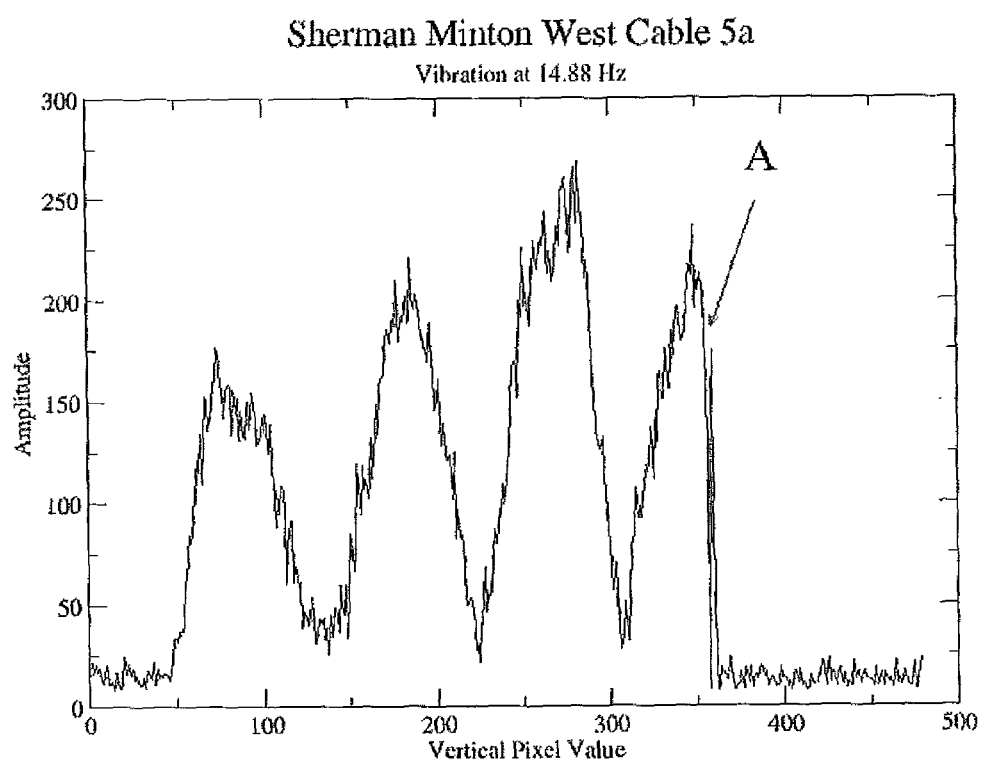
FIG. 28 is a graph of data related to data plotted in FIG. 27, as illustrative of multiple embodiments and alternatives.

The image on the left side in FIG. 27 is a bridge for vehicular traffic having vertical support cables that was measured in direct sunlight. The graph on the right of FIG. 27 is a frequency extracted image depicting vibrations at various heights on one of the cables, and FIG. 28 shows vertical pixel values as a function of measured amplitudes at the selected frequency of 14.88 Hz, and further indicates the nodal point of attachment to the bridge deck by arrow A (near the top of the graph). The highest amplitude from vibration is seen in the middle portions along the height of the support cable.

Data such as that depicted in FIG. 27 and FIG. 28 may also be used to evaluate changes in vibration (based on changes in modulation of light) of one support cable compared to others. Differences between selected cables would then be used as indicators of structural stress on the bridge. Alternatively, baseline data could be obtained for a new bridge, prior to use and then compared at selected intervals to data such as that shown in the graphs of FIG. 27 and FIG. 28 in order to evaluate structural integrity of bridge support cables.

It will be understood that the embodiments described herein are not limited in their application to the details of the teachings and descriptions set forth herein, or as illustrated in the accompanying figures. It will be understood by those having ordinary skill in the art that modifications and variations of these embodiments are reasonably possible in light of the above teachings and descriptions. The descriptions herein are not intended to be exhaustive, nor are they meant to limit the understanding of the embodiments to the precise forms disclosed. Accordingly, the foregoing descriptions of several embodiments and alternatives are meant to illustrate, rather than to serve as limits on the scope of what has been disclosed herein.

Also, it is to be understood that the phraseology and terminology used herein is for the purpose of description and should not be regarded as limiting. The use herein of "including," "comprising," "e.g.," "containing," or "having" and variations of those words is meant to encompass the items listed thereafter, and equivalents of those, as well as additional items.

We claim:

1. A system for analyzing an object element, comprising:
   a light acceptor through which light enters the system, wherein the light acceptor focuses on a field of vision that includes the object element to form a pixelated image of the object element, and light entering the system is directionally selected;
   a transducer operatively connected to the light acceptor for converting light to electrical signals; and
   a processor operatively connected to the transducer, wherein the processor receives and processes signals from the transducer indicative of changes in positioning of the object element for measuring or determining the amplitude of light modulation from a surface of the object element and for determining a change in position of the object element,
   wherein the determination of the amplitude of light modulation is related to the change in position of the object element by a feature of measurable contrast, S1–S0, of the object element as it undergoes physical displacement, dx, thereby causing a change in light modulation dS, and wherein S1 is a first reference signal related to a first location of the pixelated image and S0 is a second reference signal related to a second location of the pixelated image.

2. The system of claim 1, further comprising an amplifier and a converter, wherein the amplifier and the converter are operatively connected to the transducer and the processor.

3. The system of claim 1, wherein the light acceptor comprises a lens having a focal plane with a diameter suitable for sampling the object element in the focal plane of the lens.

4. The system of claim 1, wherein the transducer is chosen from the group photodiode, photomultiplier, and cadmium sulfide photoconductor.

5. The system of claim 1, further comprising:
   a video digitizer operatively connected to the light acceptor; and
   wherein the light acceptor is a video camera having an image forming element and the processor is operatively connected to the video digitizer, wherein the system analyzes a plurality of elements within a scene.

6. The system of claim 5, further comprising an amplifier and a converter, wherein the amplifier and the converter are operatively connected to the digitizer and the processor.

7. The system of claim 5, wherein the image forming element is chosen from the group at least one lens, at least one mirror, and combinations thereof.

8. The system of claim 7, wherein the lens has a focal plane and the video camera further includes a pixel with a width such that the pixel samples the object element in the focal plane of the lens.

9. The system of claim 5, further comprising a memory storage device operatively connected to the processor.

10. The system of claim 5, wherein the system is configured to produce an Eigenimage of at least one of the plurality of elements.

11. The system of claim 1, wherein the processor is configured to determine a change in position of the object element using the equation $$dS/(S_1-S_0)=(f/r)(dx/p)$$

wherein dS is modulation of light proportional to the change of position of the object element $S_1$ is a first reference signal measured on a first side immediately adjacent to the object element, $S_0$ is a second reference signal measured on a second side immediately adjacent the object element, and wherein f is the focal length of the light acceptor, r is the distance between the light acceptor and the object element, dx is the physical displacement of the object element, and p is the physical size of the pixel included in the image of the object element.

12. The system of claim 1, wherein the processor is configured to convert time data to frequency data.

13. A method for analyzing an object element, comprising:
   a. providing a sensor system including a light acceptor through which light enters the system, wherein the light acceptor focuses on a field of vision that includes the object element, and light entering the system is directionally selected;
   b. measuring the amplitude of light modulation from a surface of the object element;
   c. providing a processor, and configuring the processor to receive signals indicative of a property of light at the object element;
   d. providing computer executable program instructions to be executed by the processor for receiving and processing the signals; and
   e. forming a pixelated image of the object element and determining a change in position of the object element, wherein the determination of the amplitude of light modulation is related to the change in position of the object element by a feature of measurable contrast, S1–S0, of the object element as it undergoes physical displacement, dx, thereby causing a change in light modulation dS, and wherein S1 is a first reference signal related to a first location of the pixelated image and S0 is a second reference signal related to a second location of the pixelated image.

14. The method of claim 13, wherein the determination of the change in position of the object element is made using the equation:

$$dS/(S_1-S_0)=(f/r)(dx/p)$$

wherein dS is modulation of light proportional to the change of position of the object element, $S_1$ is a first reference signal measured on a first side immediately adjacent to the object element, $S_0$ is a second reference signal measured on a second side immediately adjacent the object element, and wherein f is the focal length of the light acceptor, r is the distance between the light acceptor and the object element, dx is the physical displacement of the object element, and p is the physical size of the pixel included in the image of the object element.

15. The method of claim 13, further comprising obtaining a virtual pixel representing a plurality of individual pixels of the object element image.

16. The method of claim 15, wherein obtaining a virtual pixel includes taking a sum of the plurality of individual pixels.

17. The method of claim 15, wherein obtaining a virtual pixel further includes determining a criteria representing a threshold level of light modulation, and summing a plurality of pixels that meet the criteria.

18. The method of claim 13, further comprising determining a frequency of the light modulation and producing an Eigenimage of the object element.

19. The method of claim 13, further comprising providing a memory for storing electronic information therein, and storing in the memory a plurality of frequencies and corresponding amplitudes.

20. The method of claim 13, further comprising converting time data to frequency data.

* * * * *